(12) United States Patent
Sheridan et al.

(10) Patent No.: US 11,036,868 B2
(45) Date of Patent: *Jun. 15, 2021

(54) AUTO-REMEDIATION WORKFLOW FOR COMPUTER SECURITY TESTING

(71) Applicant: WHITEHAT SECURITY, INC., San Jose, CA (US)

(72) Inventors: Eric Sheridan, Greensboro, NC (US); Harry Papaxenopoulos, Riverhead, NY (US); John Thomas Melton, Harrisburg, NC (US)

(73) Assignee: WHITEHAT SECURITY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,934

(22) Filed: May 6, 2019

(65) Prior Publication Data

US 2019/0311133 A1 Oct. 10, 2019

Related U.S. Application Data

(63) Continuation of application No. 14/656,490, filed on Mar. 12, 2015, now Pat. No. 10,282,550.

(51) Int. Cl.
*G06F 21/00* (2013.01)
*G06F 21/57* (2013.01)
*G06F 8/65* (2018.01)
*G06F 21/56* (2013.01)

(52) U.S. Cl.
CPC .............. *G06F 21/577* (2013.01); *G06F 8/65* (2013.01); *G06F 21/563* (2013.01); *G06F 21/57* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,302,707 B1 * | 11/2007 | Weber | .................... | G06F 21/577 705/51 |
| 7,392,545 B1 * | 6/2008 | Weber | .................... | G06F 21/577 705/51 |
| 8,132,260 B1 * | 3/2012 | Mayer | .................... | G06F 21/577 726/11 |
| 8,505,069 B1 * | 8/2013 | Solodovnikov | ........... | G06F 8/65 709/224 |
| 8,656,497 B2 * | 2/2014 | Amarasinghe | .......... | G06F 21/54 726/25 |
| 8,800,042 B2 * | 8/2014 | Sima | .................... | G06F 11/3664 717/168 |

(Continued)

*Primary Examiner* — Maung T Lwin
(74) *Attorney, Agent, or Firm* — Polsinelli PC

(57) ABSTRACT

Techniques for performing auto-remediation on computer system vulnerabilities in source code are disclosed herein. An application source code representation is scanned to determine any security vulnerabilities and from those vulnerabilities, a set of security patch rules are generated that may be used to automatically remediate the vulnerabilities. One or more of the security patch rules is selected for verification and, once verified may be used to generate a security patch. The security patch may then be automatically applied to the source code representation to produce a patched representation of the application source code with the vulnerability at least partly remediated.

27 Claims, 23 Drawing Sheets

(56) References Cited

U.S. PATENT DOCUMENTS

| | | | | |
|---|---|---|---|---|
| 9,009,832 | B2* | 4/2015 | Be'ery | H04L 63/14 |
| | | | | 726/23 |
| 9,015,844 | B1* | 4/2015 | Franklin | G06F 21/577 |
| | | | | 713/165 |
| 2006/0282897 | A1* | 12/2006 | Sima | G06F 11/3664 |
| | | | | 726/25 |
| 2009/0271863 | A1* | 10/2009 | Govindavajhala | G06F 21/577 |
| | | | | 726/23 |
| 2011/0185433 | A1* | 7/2011 | Amarasinghe | G06F 21/53 |
| | | | | 726/25 |
| 2011/0231936 | A1* | 9/2011 | Williams | G06F 21/577 |
| | | | | 726/25 |
| 2012/0011493 | A1* | 1/2012 | Singh | G06F 21/577 |
| | | | | 717/168 |
| 2012/0216242 | A1* | 8/2012 | Uner | G06F 21/50 |
| | | | | 726/1 |
| 2014/0210653 | A1* | 7/2014 | Harpe | H03M 1/0697 |
| | | | | 341/110 |
| 2014/0237599 | A1* | 8/2014 | Gertner | H04L 63/1441 |
| | | | | 726/24 |
| 2014/0317740 | A1* | 10/2014 | Be'ery | H04L 63/14 |
| | | | | 726/23 |
| 2015/0106939 | A1* | 4/2015 | Lietz | G06F 21/577 |
| | | | | 726/25 |
| 2016/0112457 | A1* | 4/2016 | Lietz | H04L 63/1433 |
| | | | | 726/1 |

* cited by examiner

```
001  <security_fix_rule id="4CA8-52C1-F06E-C592-5964-B358-89FC-4CE9" intrusiveness="low">
002  <!-- directly map fix rule to vulnerability rule -->
003  <criteria mode="and">
004  <vulnerability_rule_criteria mode="and">
005  <vulnerability_rule_criterion>
006  <!-- for apache.axis.technology.WebServiceListingRule from Apache.Axis RulePack.xml -->
007  <rule_id>FAB5-182C-C5F5-7DD7-44CB-D14D-FBB6-D08F</rule_id>
008  </vulnerability_rule_criterion>
009  </vulnerability_rule_criteria>
010  </criteria>
011  <!-- locate area requiring fix -->
012  <remediation>
013  <title>Disable Web Service Listing for Axis 1</title>
014  <description>
015  This vulnerability exists because the Axis configuration is not set to disable the service
016  listing. By default, Axis enables the listing of available services. This exposes the internal
017  service list of your application to anyone who requests the list. By disabling the listing of
018  services, you prevent attackers from gaining access to internal service information and reduce
019  the exposure of information about your application.
020  </description>
```

FIG. 7A

```
021    <solutions apply="first">
022    <!-- case 1: change "0" to "1" -->
023    <solution id="7385-58D0-87DA-4C14-B9DE-EC7C-6EEF-9983">
024    <search mode="exact" />
025    <replace mode="exact">
026    <with>
027    <![CDATA[1]]
028    </with>
029    </replace>
030    </solution>
031    <!-- case 2: add init-param with value of "1" -->
032    <solution id="B2B8-0934-CE9D-9379-AE73-10E0-FADE-1989">
033    <search mode="matches" value="..." />
034    <replace mode="after">
035    <with>
036    <![CDATA[
037    <init-param>
038    <param-name>axis.disableServiceList</param-name>
039    <param-value>1</param-value>
040    </init-param>
041    ]]>
042    </with>
043    </replace>
044    </solution>
045    </solutions>
046    </remediation>
047    </security_fix_rule>
```

```
001  <security_fix_rule id="44B0-07E0-30A7-AD7C-ADC7-C8BF-F43A-DEE4" intrusiveness="medium">
002   <!-- map fix rule to vulnerability class -->
003   <criteria mode="and">
004    <vulnerability_rule_criteria mode="and">
005     <!-- want to catch all issues from this rule -->
006     <vulnerability_rule_criterion>
007      <rule_id>9676-2205-DF44-87A9-7DCC-8AEF-F8EF-25B5</rule_id>
008     </vulnerability_rule_criterion>
009    </vulnerability_rule_criteria>
010   </criteria>
011   <!-- converting assignment to comparison -->
012   <considerations>
013    <consideration kind="correctness">
014     <description>
015  This change affects the correctness of the code. While this change makes the code function
016  properly, it is possible the application was depending on the presence of the incorrect
017  code in order to function as expected. Please validate any assumptions made around this
018  code.
019     </description>
020    </consideration>
021   </considerations>
```

```
022  <!-- locate area requiring fix -->
023  <remediation>
024  <title>Convert Assignment to Comparison</title>
025  <description>
026  In this vulnerability, the code is performing an assignment when a
027  comparison is expected. This can lead to invalid assumptions. An example
028  is below
029       boolean isAuthorized = false;
030       if(isAuthorized = true) {
031            //perform authorized activity
032       }
033  In this case, the general expectation is that the conditional expression
034  should evaluate to false. However, since the code is performing an
035  assignment, the conditional expression will always evaluate to true,
036  thereby always executing.
037  The fix in this case is simple: changing the assignment to a comparison
038  resolves the issues and corrects the semantic intention of the code.
039  </description>
040  <solutions apply="first">
041  <!-- case 1: change "=" to "==" -->
042  <solution id="3054-821D-2B65-9F08-30BC-1245-4B43-2EF1">
043  <search mode="exact">
044  <!-- limit solution to java programming language -->
045  <language_criteria mode="or">
046  <language_criterion name="java" />
047  </language_criteria>
048  </search>
049  <replace mode="exact">
050  <with>
051  <![CDATA[==]]>
052  </with>
053  </replace>
054  </solution>
055  </solutions>
056  </remediation>
057  </security_fix_rule>
```

```
001  <security_fix_rule id="CA7A-78C2-0F2D-863E-28B2-9B38-07CA-69CB" intrusiveness="high">
002    <!-- map fix rule to vulnerability class -->
003    <criteria mode="and">
004      <vulnerability_rule_criteria mode="and">
005        <vulnerability_rule_criterion>
006          <class_name>Cryptography.Persist.Ccn.Unencrypted</class_name>
007        </vulnerability_rule_criterion>
008      </vulnerability_rule_criteria>
009    </criteria>
010    <!-- considerations for altering CCN encryption -->
011    <considerations>
012      <consideration kind="data_persistence" />
013      <consideration kind="data_consumption" />
014      <consideration kind="data_classification_policy" />
015    </considerations>
016    <!-- locate area requiring fix -->
017    <remediation>
018      <title>Persist CCN in Encrypted Form</title>
019      <description>
020        Storing a credit card number in a form that is not encrypted can lead to serious legal and
021        policy impacts. It also increases the likelihood of disclosure and the impact if a breach
022        should occur. This solution fixes this issue by performing AES-256 encryption on the CCN
023        before storage. Note there are several ramifications of this change, including modified data
024        storage requirements as well as performing decryption anywhere the data is read back from
025        storage. This solution also allows you to select the mechanism for key retrieval.
026      </description>
```

FIG. 9A

```
027  <solutions apply="select">
028  <!-- case 1: inject encryption for java using key from file -->
029  <solution id="91B1-9136-02FA-4D30-8183-F183-F5AE-27AD">
030  <search mode="position">
031  <!-- limit solution to java programming language -->
032  <language_criteria mode="or">
033  <language_criterion name="java" />
034  </language_criteria>
035  </search>
036  <replace mode="exact">
037  <with>
038  <!-- note: DATA_FLOW_REPLACEMENT_KEY is a built-in variable that contains the original text identified
039       by the "search" criteria -->
040  <![CDATA[com.cryptography.CryptographyHelper.encryptWithKeyFromFile
041         (${DATA_FLOW_REPLACEMENT_KEY},
042         new java.io.File("${file_name}"))
043  ]]>
044  </with>
045  </where>
046  <!-- user must indicate file where encryption key is stored -->
047  <property name="file_name" kind="text" />
048  </where>
049  </replace>
050  <dependencies>
051  <dependency kind="file">
052  <location>com/cryptography/CryptographyHelper.java</location>
053  </dependency>
054  </dependencies>
055  </solution>
```

FIG. 9B

```
056  <!-- case 2: injection encryption for java using key from environment variable -->
057  <solution id="3119-FE9F-5D00-AC9A-E21A-C13A-3AB3-0AE9">
058    <search mode="position">
059      <!-- limit solution to java programming language -->
060      <language_criteria mode="or">
061        <language_criterion name="java" />
062      </language_criteria>
063    </search>
064    <replace mode="exact">
065      <with>
066      <!-- note: DATA_FLOW_REPLACEMENT_KEY is a built-in variable that contains the original text identified
067      by the "search" criteria -->
068      <![CDATA[com.cryptography.CryptographyHelper.
069              encryptWithKeyFromEnvironmentVariable(${DATA_FLOW_REPLACEMENT_KEY},
070                                                    java.lang.System.getenv("${environment_variable}"))
071      ]]>
072      </with>
073      <where>
074        <!-- user must indicate environment variable where key is stored -->
075        <property name="environment_variable" kind="text" />
076      </where>
077    </replace>
078    <dependencies>
079      <dependency kind="file">
080        <location>com/cryptography/CryptographyHelper.java</location>
081      </dependency>
082    </dependencies>
083  </solution>
084  </solutions>
085  </remediation>
086  </security_fix_rule>
```

FIG. 9C

```
001  <security_patch_rules phase="review" xmlns="security_patch_rules.xsd">
002  <security_patch_rule id="CA7A-78C2-0F2D-863E-28B2-9B38-07CA-69CB" intrusiveness="high">
003    <criteria>
004      <vulnerability>6F33-6FA5-B7B6-9B42-9F3D-BAAA-B5CB-FD25</vulnerability>
005      <file_hashes>
006        <file_hash>
007          <relative_path>...</relative_path>
008          <absolute_path>...</absolute_path>
009          <hash>
010            5AE175B9C05C83AEC1BDB36B38C8AC495A6C0CBD0F1076C95EFC8268CD44A2C91E38A3802B754
011            A9D4332A244E4BF4BC6169A6EE4F2E69298D3160A1900A24022
012          </hash>
013        </file_hash>
014      </file_hashes>
015    </criteria>
016    <!-- converting assignment to comparison -->
017    <considerations>
018      <consideration kind="data_persistence">
019        <description>...</description>
020      </consideration>
021      <consideration kind="data_consumption">
022        <description>...</description>
023      </consideration>
024      <consideration kind="data_classification_policy">
025        <description>...</description>
026      </consideration>
027    </considerations>
028    <!-- locate area requiring fix -->
029    <remediation>
030      <title>Persist CCN in Encrypted Form</title>
031      <description>...</description>
032      <solutions apply="select">
```

FIG. 12A

```
033  <!-- case 1: inject encryption for java using key from file -->
034  <solution id="91B1-9136-02FA-4D30-8183-F183-F5AE-27AD">
035   <replace mode="exact">
036    <at>
037     <relative_file_path>...</relative_file_path>
038     <absolute_file_path>...</absolute_file_path>
039     <line_number>
040      <start>1</start>
041      <end>1</end>
042     </line_number>
043     <column_number>
044      <start>1</start>
045      <end>1</end>
046     </column_number>
047    </at>
048    <with>
049     <!-- note: search_text is a built-in variable that contains the original text identified by the
050     "search" criteria -->
051     <![CDATA[com.cryptography.CryptographyHelper.encryptWithKeyFromFile
052     ("${search_text}", new java.io.File("${file_name}"))
053     ]]>
054    </with>
055    <where>
056     <!-- user must indicate file where encryption key is stored -->
057     <property name="file_name" kind="text" />
058    </where>
059   </replace>
060  </solution>
061  <!-- case 2: injection encryption for java using key from environment variable -->
062  <solution id="3119-FE9F-5D00-AC9A-E21A-C13A-3AB3-0AE9">
063   <replace mode="exact">
064    <at>
065     <relative_file_path>...</relative_file_path>
066     <absolute_file_path>...</absolute_file_path>
067     <line_number>
068      <start>1</start>
069      <end>1</end>
070     </line_number>
```

FIG. 12B

```
071  <column_number>
072  <start>1</start>
073  <end>i</end>
074  </column_number>
075  </at>
076  <with>
077  <!-- note: search_text is a built-in variable that contains the original text identified by the
078        "search" criteria -->
079  <![CDATA[com.cryptography.CryptographyHelper.
080        encryptWithKeyFromEnvironmentVariable
081              ("${search_text}", java.lang.System.getenv("${environment_variable}"))
082  ]]>
083  </with>
084  <where>
085  <!-- user must indicate environment variable where key is stored -->
086  <property name="environment_variable" kind="text" />
087  </where>
088  </replace>
089  <dependencies>
090  <dependency kind="file">
091  <location>some/file/name/where.java</location>
092  </dependency>
093  <dependency kind="file">
094  <location>some/file/name/where.java</location>
095  </dependency>
096  <dependency kind="maven">
097  <location>com.bouncycastle:crypto:1.3.3</location>
098  </dependency>
099  </dependencies>
100  </solution>
101  </solutions>
102  </remediation>
103  </security_patch_rule>
```

FIG. 12C

```
001  <security_patch_rules phase="apply" xmlns="security_patch_rules.xsd">
002    <security_patch_rule id="CA7A-78C2-0F2D-863E-28B2-9B38-07CA-69CB" intrusiveness="high">
003      <criteria>
004        <vulnerability>6F33-6FA5-B7B6-9B42-9F3D-BAAA-B5CB-FD25</vulnerability>
005        <file_hashes>
006          <file_hash>
007            <relative_path>...</relative_path>
008            <absolute_path>...</absolute_path>
009            <hash>
010              5AE175B9C05C83AE C1BDB36B38C8AC495A6C0CBD0F1076C95EFC8268CD44A2C91E38A3802B754A
011              8D4332A244E4BF4BC6169A6EE4F2E69298D3160A1900A24022
012            </hash>
013          </file_hash>
014        </file_hashes>
015      </criteria>
016      <!-- converting assignment to comparison -->
017      <considerations>
018        <consideration kind="data_persistence">
019          <description>...</description>
020        </consideration>
021        <consideration kind="data_consumption">
022          <description>...</description>
023        </consideration>
024        <consideration kind="data_classification_policy">
025          <description>...</description>
026        </consideration>
027      </considerations>
028      <!-- locate area requiring fix -->
029      <remediation>
030        <title>Persist CCN in Encrypted Form</title>
031        <description>...</description>
```

FIG. 14A

```
032  <solutions apply="select">
033  <!-- case 1: inject encryption for java using key from file -->
034  <solution id="91B1-9136-02FA-4D30-8183-F183-F5AE-27AD">
035  <replace mode="exact">
036  <at>
037  <relative_file_path>...</relative_file_path>
038  <absolute_file_path>...</absolute_file_path>
039  <line_number>
040  <start>1</start>
041  <end>1</end>
042  </line_number>
043  <column_number>
044  <start>1</start>
045  <end>1</end>
046  </column_number>
047  </at>
048  <with>
049  <!-- note: search_text is a built-in variable that contains the original text identified by the
050  "search" criteria -->
051  <![CDATA[com.cryptography.CryptographyHelper.encryptWithKeyFromFile
052     ("${search_text}", new java.io.File("${file_name}"))
053  ]]>
054  </with>
055  <where>
056  <!-- user must indicate file where encryption key is stored -->
057  <property name="file_name" kind="text">
058  <value>/some/file.key</value>
059  </property>
060  </where>
061  </replace>
062  </solution>
063  </solutions>
064  </remediation>
065  </security_patch_rule>
```

FIG. 14B

AUTO-REMEDIATION WORKFLOW FOR COMPUTER SECURITY TESTING

CROSS-REFERENCE TO RELATED APPLICATIONS

This application is a continuation application of U.S. patent application Ser. No. 14/656,490, filed Mar. 12, 2015, now U.S. Pat. No. 10,282,550, and incorporates by reference for all purposes the full disclosure of co-pending U.S. patent application Ser. No. 14/656,503, Mar. 15, 2015, now U.S. Pat. No. 9,792,443.

BACKGROUND

Modern computer systems may comprise of a variety of components, some of which are provided by third-parties and some of which are developed in-house. Components developed in-house may receive frequent updates to, for example, add new features or to fix defects. Such updates may introduce security vulnerabilities in the computer system, some of which may be difficult to locate. For example, a source code change to fix a defect in a software component may pass unit tests, regression tests, "black box" tests, and other such tests, but may still introduce security vulnerabilities due to interaction with other components in the system. Maintaining the security of such complex systems may be made more difficult when such components frequently change.

Software testing and, in particular, static code analysis may be used to identify some software vulnerabilities. In static code analysis, a software application is tested without actually executing the application. The software application is typically tested by processing and analyzing the source code of the application. The entire source code of the application, or only portions of the source code, may be analyzed. The source code may be analyzed for one or more of a variety of purposes, such as for identifying possible coding errors, determining properties of the software application, or determining vulnerabilities. However, such analysis may only identify errors and vulnerabilities without performing any steps to remediate such vulnerabilities. Additionally, such analysis may only locate one of a plurality of vulnerabilities, particularly when such vulnerabilities occur at or near a control flow, where a plurality of execution paths may be taken. Such analysis and remediation may become even more complex in source code that makes use of modern programming paradigms such as object-oriented programming, inversion of control, dependency injection, and aspect-oriented programming. Failure to remediate such source code security vulnerabilities may make computer systems less stable, less available, and/or less secure, leading to a degraded experience for users of those systems.

BRIEF SUMMARY

Systems, processes, and methods for performing auto-remediation on computer system security vulnerabilities in source code are described herein. Source code may be scanned for security vulnerabilities using, for example, static analysis techniques. Such security vulnerabilities may then be used to automatically identify and generate a set of candidate patch rules each of which may be used to remediate one or more of the security vulnerabilities. One or more of the set of candidate patch rules may then be selected for verification and updating by an owner of the source code (e.g., an end-user) and the selected candidate patch rules may then be automatically applied to the source code to generate patched source code with the security vulnerabilities removed, thereby remediating the security vulnerability, which may then be tested, verified, and/or merged back into the source code.

The following detailed description together with the accompanying drawings will provide a better understanding of the nature and advantages of the present invention.

BRIEF DESCRIPTION OF THE FIGURES

Various embodiments in accordance with the present disclosure will be described with reference to the drawings, in which:

FIGS. 7A and 7B illustrate an example specification for a security fix rule in accordance with an embodiment;

FIGS. 8A and 8B illustrate an example specification for a security fix rule in accordance with an embodiment;

FIGS. 9A, 9B, and 9C illustrate an example specification for a security fix rule in accordance with an embodiment;

FIGS. 12A, 12B, and 12C illustrate an example specification for a security patch rule in review phase in accordance with an embodiment;

FIGS. 14A and 14B illustrate an example specification for a security patch rule in apply phase in accordance with an embodiment;

DETAILED DESCRIPTION

Figure 1:
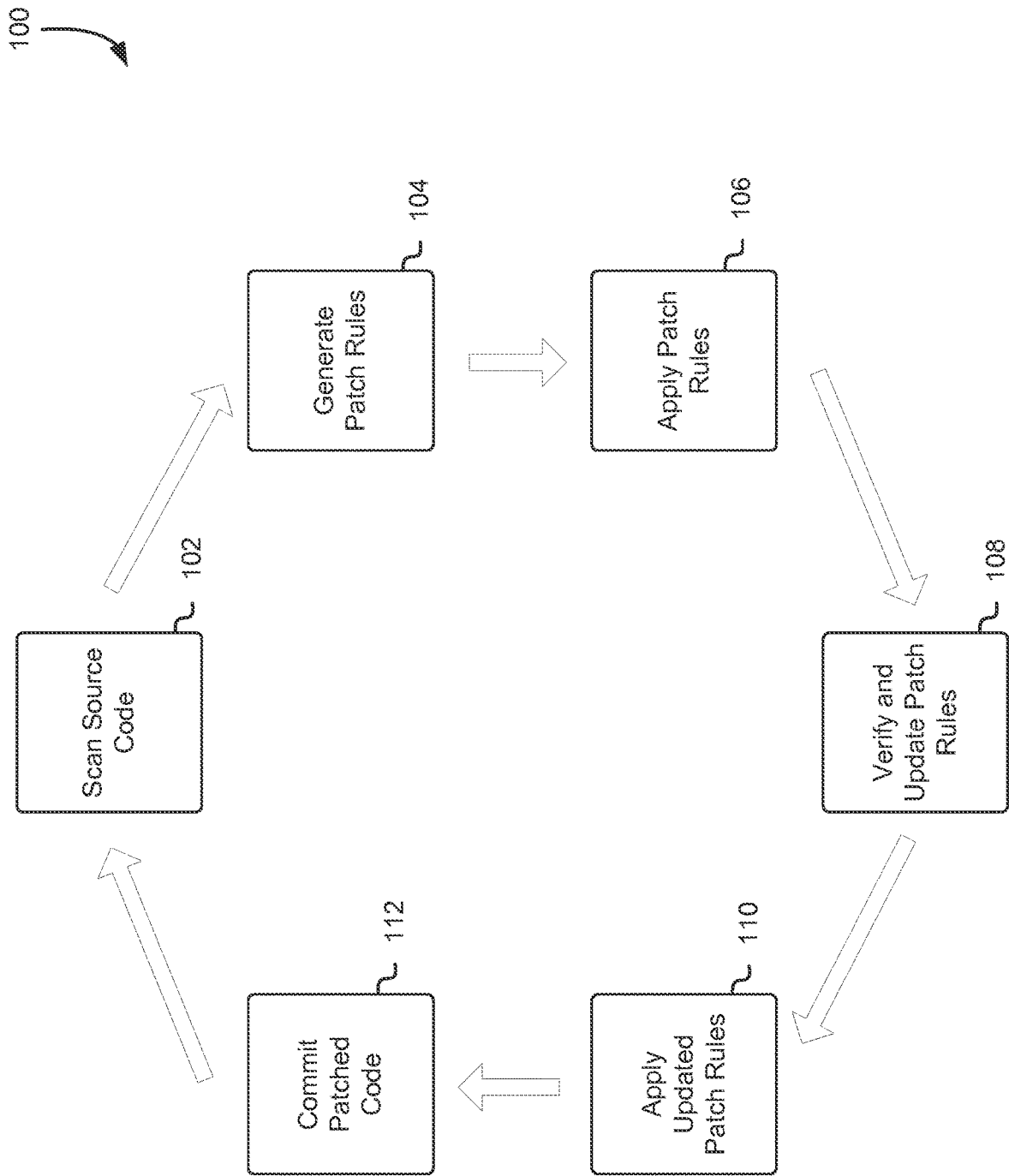
FIG. 1 illustrates an example workflow for performing auto-remediation on computer system security vulnerabilities in source code in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for performing auto-remediation on computer system security vulnerabilities in source code. The first step in performing auto-remediation on computer system security vulnerabilities in source code is that a representation of source code may be scanned for security vulnerabilities using static analysis and/or dynamic analysis techniques. In some embodiments, the scanning of the source code and/or the determination of vulnerabilities may be performed by an external process or preprocess such as, for example, by a process configured to implement static analysis or static application security testing. In some embodiments, the process configured to implement static analysis or static application security testing may be configured as an analysis service. In some embodiments, the scanning of the source code and/or the determination of vulnerabilities may be performed by an auto-remediation engine as described herein. As a result of this scan, one or more security vulnerabilities and/or the location of those vulnerabilities within the source code representation may be identified.

Vulnerabilities may be, for example, instances in the code where sensitive data may be made available to a malicious attacker or where execution of code may make control of a software system available to unprivileged users. For example, in source code that processes credit card numbers, any clear text (unencrypted) storage of the credit card number may be considered a security vulnerability (also referred to herein simply as a "vulnerability") due to the possibility of making such information available to an attacker.

A next step in performing auto-remediation on computer system security vulnerabilities in source code is that one or more security patch rules may be generated based on the source code representation and/or the vulnerabilities. Security patch rules (also referred to herein simply as "patch rules") are rules for applying security patches to a source code representation based on the one or more system security vulnerabilities. Rules are typically embodied in data structures that can be read and interpreted by a program such as a rules processor. For example, a source code patch processing program might read in source code from memory or other electronic storage, read in a set of rules records from a rules store or rules database, with the source code patch processing program having program instructions on how the rules records that are applied would modify the source code that is read in.

Security patch rules may be generated by selecting one or more patch rules from a patch rules repository. A rules repository might contain records of patch rules that are authored and entered by security subject matter experts based on, for example, previous experience, known vulnerabilities, or known computer system conditions. The rules repository might contain some patch rules that are sourced from other than security subject matter experts. In some embodiments, the patch rules may be automatically generated and/or automatically selected based on rules expressing such previous experience, known vulnerabilities, or known computer system conditions. For example, in the above instance with source code that processes unencrypted credit card numbers, a security patch rule may be authored to encrypt the credit card number by a security subject matter expert and stored in a patch rules repository. The rule may be generated by automatically selecting from the patch rules repository by an auto-remediation engine based on the detected vulnerability.

A security patch rule may include rules for applying a plurality of possible patches to the source code representation based on the vulnerabilities including, for example, multiple types of encryption to implement, multiple source code modifications, or combinations of these and/or other types of patches to the source code. For example, a security patch rule may include a patch to add encryption calls to the source code and also may include variations of that patch that choose different encryption methodologies. A security patch rule may specify rules for applying security patches in terms of statements generally of the form "if a vulnerability exists at a determined location, apply a selected patch to the source code representation at a location relative to the determined location." Such security patch rules may be specified as name-value pairs, as scripts (e.g., XML scripts, JSON scripts, or JavaScript), or as some other rules representation.

One or more of the plurality of possible patches in the security patch rule may then be applied to the source code representation to produce one or more at least partially patched source code representations. The at least partially patched source code representations may, for example, not be completely patched due to their missing the final specification of additional values (also referred to herein as "optional parameters") indicated in the security patch rule. As an example of such partial patches, a security patch rule to add encryption to a source code representation may specify an encryption method that requires a security key obtained from a security key file located on a computer system that the source code may be executed on. As different implementations may locate the security key file in different locations, the location of the security key file may be left as an additional (i.e., to be specified later) value in the security patch rule. Similarly, the security patch rule may specify an encryption method that obtains a security key from a location specified by an environment variable, the value of which may also be an additional value in the security patch rule. As may be contemplated, the additional values in the security patch rules described herein are merely illustrative example and other such additional values in the security patch rules may be considered as within the scope of the present disclosure.

The one or more at least partially patched source code representations may then be verified by, for example, a security subject matter expert, may have the additional values filled in, also by a security subject matter expert and/or additionally by one or more end users. One of the partially patched source code representations may then be selected for completion, completed (i.e., all additional values specified), and applied to the source code representation. In some embodiments, one or more steps of the verification, selection, and completion of the security patch rules may be automatically performed by an auto-remediation engine as described herein. In some embodiments, one of more of the steps of the verification, selection, and completion of the security patch rules may be performed by a user such as a security subject matter expert, a system administrator, a customer, or an end user.

The final step in performing auto-remediation on computer system security vulnerabilities in source code is to use the verified, selected, and completed security patch rule to patch the source code representation and to commit the patched source code representation for use in place of the formerly vulnerable code. In some embodiments, additional testing and/or verification may be applied to the updated code including, but not limited to, unit testing, regression testing, black box testing, static analysis, dynamic analysis, or other such testing methodologies.

FIG. 1 illustrates a workflow 100 for performing auto-remediation on computer system security vulnerabilities in source code in accordance with an embodiment. The workflow 100 illustrated in FIG. 1 may be performed by an auto-remediation engine and/or by one or more components thereof. At least a portion of the workflow 100 illustrated in FIG. 1 may also be performed by external components associated with the auto-remediation engine such as, for example, a static security analysis application. First, a representation of source code may be scanned 102 to, for example, detect security vulnerabilities. The source code representation may be a listing (i.e., the textual representation of a program) of source code that may be compiled to generate machine code such as, for example, code written in BASIC, C, C++, Fortran, Lisp, or other such languages. The source code representation may also be a listing of source code that may be compiled into bytecode such as, for example, code written in C #, Java, or other such languages. The source code representation may also be a listing of source code that may be interpreted such as, for example, code written in Java, JavaScript, Perl, PHP, Python, Ruby, a scripting language (e.g., TCL or Lua), or other such interpreted languages. In some embodiments, the source code representation may include the machine code generated by a compiler, bytecode generated by an interpreter, or an intermediate representation of the source code such as, for example, an abstract syntax tree, or some other data structure.

As described above, the representation of source code may be scanned for security vulnerabilities using static analysis and/or dynamic analysis techniques. In static analysis (also referred to herein as "static application security testing"), the representation of the source code may be scanned while the source code is not executing, and where branch points are located by the scan with multiple possible outcomes, each possible branch may be analyzed. For example, a source code statement that effectively states "if a variable is less than zero, perform a first set of actions and if not, perform a second set of actions" may be analyzed as if the variable is less than zero as well as if the variable is not less than zero. In dynamic analysis, the representation of the source code may be scanned while the source code is executing. Such analysis only analyzes branches in code that are taken during the dynamic analysis. For example, in the example above, if the variable is never less than zero during the dynamic analysis, the analysis of the first set of actions may never be performed.

In some embodiments, in order to perform auto-remediation on computer system security vulnerabilities in source code using static analysis and/or dynamic analysis, the static and/or dynamic analysis tools may be altered or enhanced to provide additional information (also referred to herein as "additional metadata") to the auto-remediation engine. For example, some method of detecting conflicts when merging security patches may be needed such as, for example, by generating file name hashes. Additionally, some consistent method of determining line numbers and/or column numbers (i.e., for the beginning and end columns) of each line may be needed. Another enhancement to static and/or dynamic analysis tools may be enhanced position analysis as described herein. One example of enhanced position analysis may be that the static and/or dynamic analysis tools may determine what portion of a string or input an attacker may control throughout a source code representation in order to determine a best location for applying a security patch. Such enhancements may provide the additional metadata as, for example, part of the vulnerability data as described herein. As may be contemplated, the alterations or enhancements to the static and/or dynamic analysis tools described herein are illustrative examples and other such alterations or enhancements to the static and/or dynamic analysis tools may be considered as within the scope of the present disclosure.

After the representation of the source code is scanned 102 for security vulnerabilities, those security vulnerabilities, combined with the source code representation may be used to generate one or more patch rules 104 which may include a plurality of possible patches that may be applied to the source code representation to address the security vulnerabilities. In an embodiment, additional data and/or metadata about the vulnerabilities may be provided as a result of the scanning when the representation of the source code is scanned 102. Such data and/or metadata may be used to generate the one or more patch rules 104 by, for example, indicating the type of the vulnerability, indicating the severity of the vulnerability, determining the priority for addressing the vulnerability, determining a position within the source code representation where a patch may be best applied to address the vulnerability, providing suggestions for additional values in the security patch rule, or to address other such factors that may be used to generate the one or more patch rules 104. For example, as a result of a scan of the source code representation, a plurality of security vulnerabilities may be identified. Each security vulnerability may have an associated security patch rule that may specify a plurality of possible patches that may be used to address the security vulnerability. The data and/or metadata associated with the vulnerabilities may determine, for example, the most effective location within the source code representation to apply the security patch rule. The scope and content of the one or more security patch rules is described in more detail below.

After the security patch rules are generated, the generated security patch rules may be applied 106 to the source code representation. As described above, a security patch rule may include a plurality of possible patches to the source code representation and one or more of the plurality of possible patches may be applied to the source code representation to produce one or more partially or fully patched source code representations. Each of the one or more partially or fully patched source code representations may then be provided along with the generated security patch rules so that the security patch rules may be verified and updated 108. The one or more partially or fully patched source code representations may be provided with the generated security patch rules to illustrate the results of applying the security patch rules to the source code representation.

When the security patch rules are verified and updated 108, the security patch rules may have missing additional values provided, may have one or more of a plurality of suggested solutions selected, may have locations to apply a patch determined, or may have other verification and update operations performed. For example, a security patch rule may be generated and applied that may have two different suggested solutions to address the vulnerability, each solution of which may have one or more missing additional values, and with two different possible locations to apply each of the suggested solutions. The security patch rule may include four possible solution choices (i.e., each of the two possible solutions in each of the two possible locations) with missing additional values for each. The process where the security patch rules are verified and updates 108 may perform operations to select one or the four possible solution choices and provide the missing additional values for the chosen solution, as described above.

After the security patch rules are verified and updated 108, the security patch rule may be used to patch the source code representation by applying the updated security patch rule 110. The patched source code representation may then be integrated with the rest of the source code by, for example, committing the code 112 to a source code repository before the next scan of the source code to find additional vulnerabilities. As described above, there may be additional testing and/or verification operations in the workflow 100 described in FIG. 1 including, but not limited to, additional security subject matter expert verification, additional end-user or customer verification, unit testing, regression testing, black box testing, static analysis, or dynamic testing. Such additional testing and/or verification operations may be automated, may be manually performed, or may be performed using a combination of these and/or other techniques.

Figure 2:
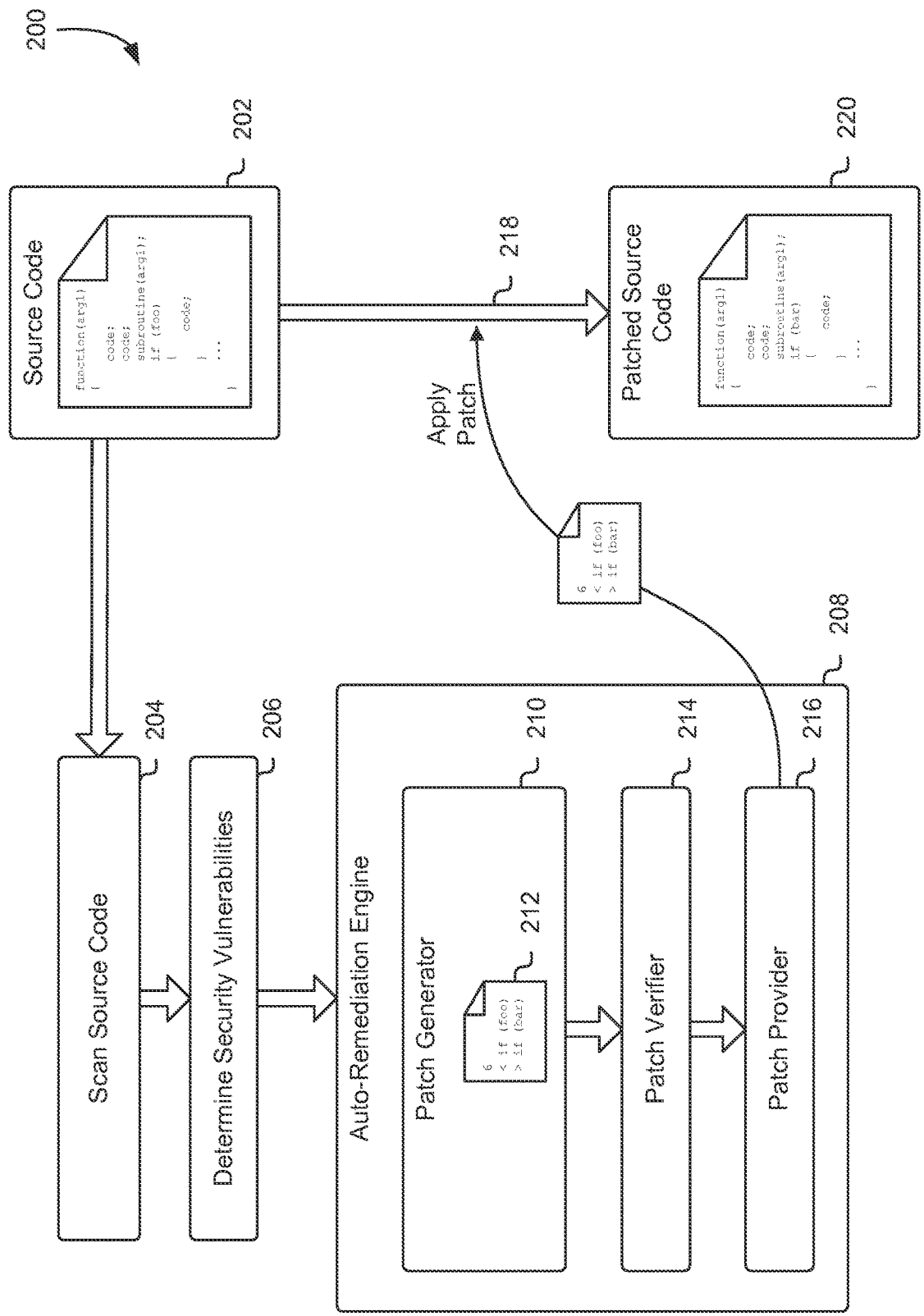
FIG. 2 illustrates an example environment for performing auto-remediation on computer system security vulnerabilities in source code in accordance with an embodiment.

FIG. 2 illustrates an environment 200 for performing auto-remediation on computer system security vulnerabilities in source code as described herein in connection with FIG. 1 and in accordance with an embodiment. A source code representation 202 may be scanned 204 by a source code scanner to determine security vulnerabilities 206 as described herein. The security vulnerabilities 206 may then be provided to a process such as the auto-remediation engine 208, which may be configured to generate a patch to the source code representation based at least in part on the security vulnerabilities 206 as described herein. The process to scan the source code representation may be performed by an external process such as, for example, a process associated with a static analysis service as described herein. The process to scan the source code representation may also be performed by the auto-remediation engine or by a process associated with the auto-remediation engine 208. Similarly, the process to determine security vulnerabilities 206 may be performed by an external process such as, for example, a process associated with static analysis, by the auto-remediation engine 208, or by a process associated with the auto-remediation engine 208.

The auto-remediation engine 208 may then use the security vulnerabilities 206 so that a patch generator 210 may generate a patch to remediate one or more of the security vulnerabilities 206 and the generated patch 212 may then be verified by a patch verifier 214 using one or more of the techniques described herein. The generated patch 212 may then be provided by a patch provider 216 to one or more consumers such as, for example, a utility process configured to receive the patch and use the information specified therein to patch the source code. In some embodiments, the auto-remediation engine 208 and/or a process associated with the auto-remediation engine 208 may apply the patch 218 to the source code representation 202 to produce patched source code 220.

Figure 3:
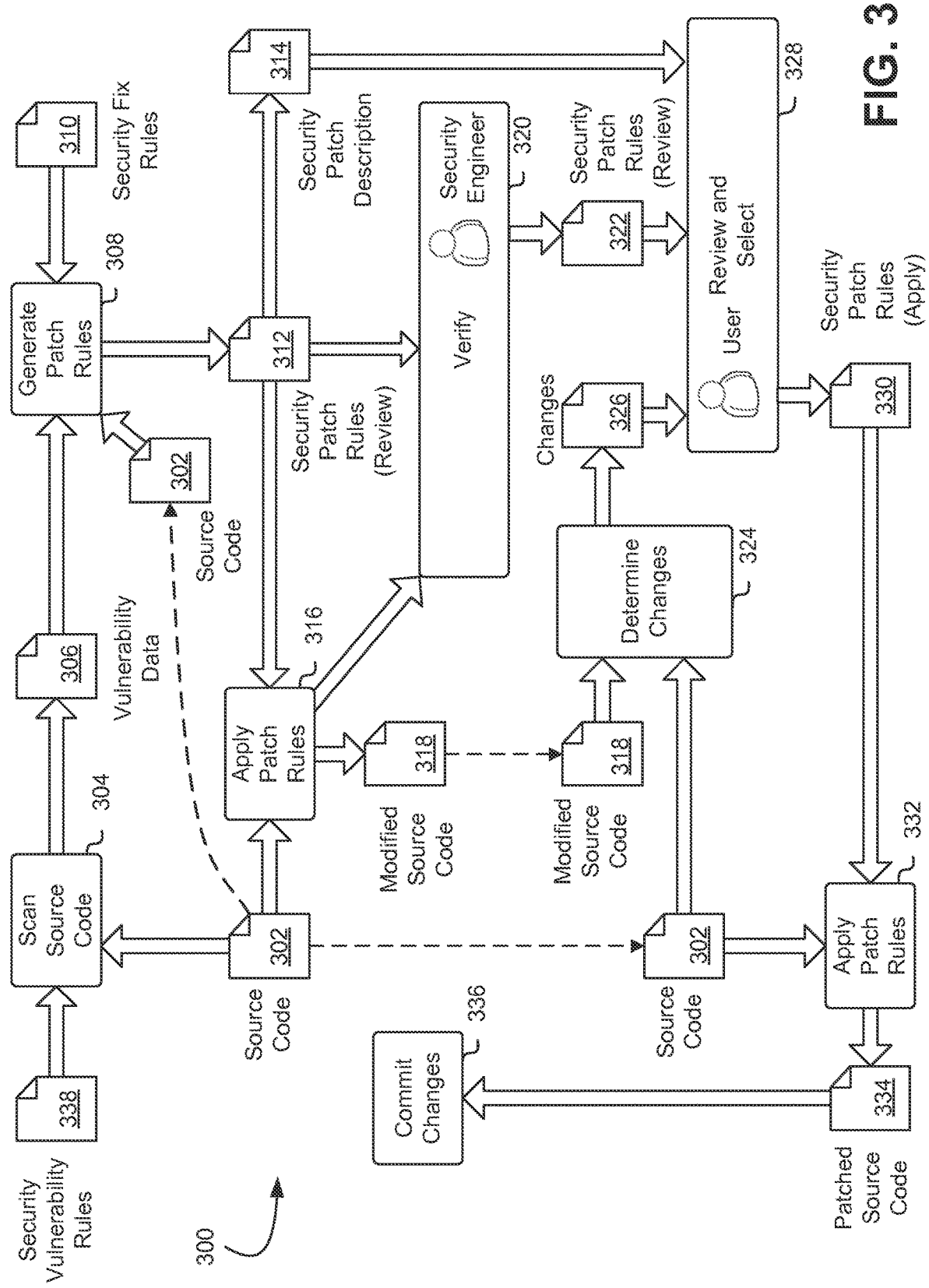
FIG. 3 illustrates an example data flow diagram for performing auto-remediation on computer system security vulnerabilities in source code in accordance with an embodiment.

FIG. 3 illustrates a data flow diagram 300 for performing auto-remediation on computer system security vulnerabilities in source code as described herein in connection with FIG. 1 and in accordance with an embodiment. A source code representation 302 of a subset of the set of source code associated with a computer system may be scanned 304 to produce vulnerability data 306 as described above. The vulnerability data 306 may include data associated with the vulnerability including, but not limited to, the location, severity, and impact of the vulnerability if it is not remediated. The vulnerability data 306 may also include metadata associated with the vulnerability including, but not limited to, the basis for identifying the vulnerability or details about how the vulnerability may impact the source code representation. For example, the vulnerability data 306 may include position data and/or metadata that may be used to determine a location within the source code representation where the source code may be most vulnerable or that may be used to determine a location within the source code representation where a security patch may be most effectively applied to remediate the vulnerability. These operations, to be performed efficiently, can be performed by a computer.

In some embodiments, the data and/or metadata associated with the vulnerability may be determined by applying one or more security vulnerability rules 338. Security vulnerability rules 338 may include rules authored by a security subject matter expert and/or may include rules based on specific domain knowledge. Security vulnerability rules 338 may also include one or more security vulnerability criteria that may be used to determine whether a security vulnerability exists. For example, in some programming languages it may be a potential vulnerability to have an assignment operator (a single equals sign) inside a conditional test rather than a compare operation (a double equals sign). A security vulnerability rule may enable detecting such vulnerabilities by searching for conditional statements in a source code representation with single equals signs within the condition. The security vulnerability criteria may include the criteria to identify conditional statements in the source code representation and may also include the criteria to distinguish assignment operations from compare operations. As different computer system languages may have different types of conditional statements and/or different operators, the security vulnerability criteria may also include language specific criteria. In some embodiments, the security vulnerability rules may be authored by security subject matter experts. In some embodiments, the security vulnerability rules may also be determined by experimentation such as, for example, by simulating the execution of source code. Such security vulnerability rules may be stored in a security vulnerability rules table that is configured to allow an auto-remediation engine to selectively apply the rules to a source code representation and use the results of the rules to identify security vulnerabilities.

The vulnerability data 306 combined with one or more security fix rules 310 by an auto-remediation engine to select and/or generate patch rules 308. In an embodiment, the source code representation 302 may also be combined with the vulnerability data 306 and the one or more security fix rules 310 to select and/or generate patch rules 308. The patch rules may be selected and/or generated by a patch generator such as the patch generator 210 described in connection with FIG. 2. The security patch rules may first be selected and/or generated in review phase 312. The security patch rules in review phase 312 may be generated with a security patch description 314. The security patch description 314 may be a description of the security patch rules and may also include a description of any additional parameters that are required to complete the security patch rule.

For example, the security patch description 314 may include a title, a brief description of the security patch, a consideration, and/or intrusiveness information. The consideration may be a measure of how different systems and/or subsystems may be affected by the security patch. The consideration may include one or more metrics indicating how the different systems and/or subsystems may be affected by the security patch. The intrusiveness information may be a scale (e.g., "low," "medium," and "high") indicating the amount of changes in the security patch. The security patch information may be configured to allow an end-user and/or a security subject-matter expert to make an informed decision about whether to accept the auto-remediation suggestion specified by the security patch rules. In some embodiments, the security patch description 314 may be included with the security patch rule in review phase 312. In some embodiments, the security patch description 314 may be separate from the security patch rule in review phase 312.

The security patch rules in review phase 312 may then be verified 320 to ensure, for example, that the security patch rules in review phase 312 were properly selected and/or generated and additionally to ensure that the security patch rules in review phase 312 may provide remediation for the security vulnerabilities identified in the vulnerability data 306. The security patch rules in review phase 312 may be verified 320 by a patch verifier such as the patch verifier 214 described in connection with FIG. 2 and/or may be verified by a subject-matter expert such as, for example, a security engineer. In the example illustrated in FIG. 3, the security patch rules in review phase 312 may be verified 320 by a security engineer. In some embodiments, the security patch rules in review phase 312 may be verified 320 by a security subject matter expert, or by an end-user, or by some other such person. In some embodiments, the security patch rules in review phase 312 may be verified 320 by an automated process such as, for example, by an expert system associated with the auto-remediation engine. In some embodiments, the security patch rules in review phase 312 may be verified 320 by a combination of persons and processes and/or may also be verified a plurality of times by different persons or processes. In some embodiments, the security patch rules in review phase 312 may be applied 316 to the source code representation 302 by, for example, a security patch applicator to produce a set of modified source code representations 318. Each of the modified source code representations 318 may be generated by applying one or more of the security patch rules in review phase 312 to the source code representation 302. The modified source code representations 318 may be used in combination with the security patch rules in review phase 312 when the security patch rules in review phase 312 are verified 320 to, for example, illustrate the effects of applying each of the security patch rules in review phase 312 to the source code representation 302.

The verified security patch rules in review phase 322 may then be provided for review and selection 328 to produce the security patch rules in apply phase 330 as described herein. In the example illustrated in FIG. 3, the verified security patch rules in review phase 322 may be provided to a user (e.g., an end user) for review and selection 328. In some embodiments, the verified security patch rules in review phase 322 may also be provided to a security subject matter expert, or to a system administrator, or to an automated process (e.g., an expert system), or to a combination of these and/or other such entities for review and selection 328. The security patch description 314 may also be provided to aid in the review and selection and, in some embodiments, a set of changes 326 may also be provided. The set of changes 326 may be produced by the auto-remediation engine by comparing the source code representation 302 to one or more of the set of modified source code representations 318 to determine the changes 324 suggested by each of the security patch rules in review phase 312.

The security patch rules in apply phase 330 may then be applied 332 to the source code representation 302 by a security patch applicator to produce the patched source code 334. In some embodiments, the security patch rules in apply phase 330 may undergo one or more additional verification steps before they are applied 332 to the source code representation 302 by the security patch applicator. In some embodiments, the patched source code 334 may also undergo one or more additional verification steps such as, for example, unit testing, regression testing, black box testing, or other such testing, before the patched source code is committed 336 to a source code repository for integration with the set of source code associated with the computer system.

Figure 4:
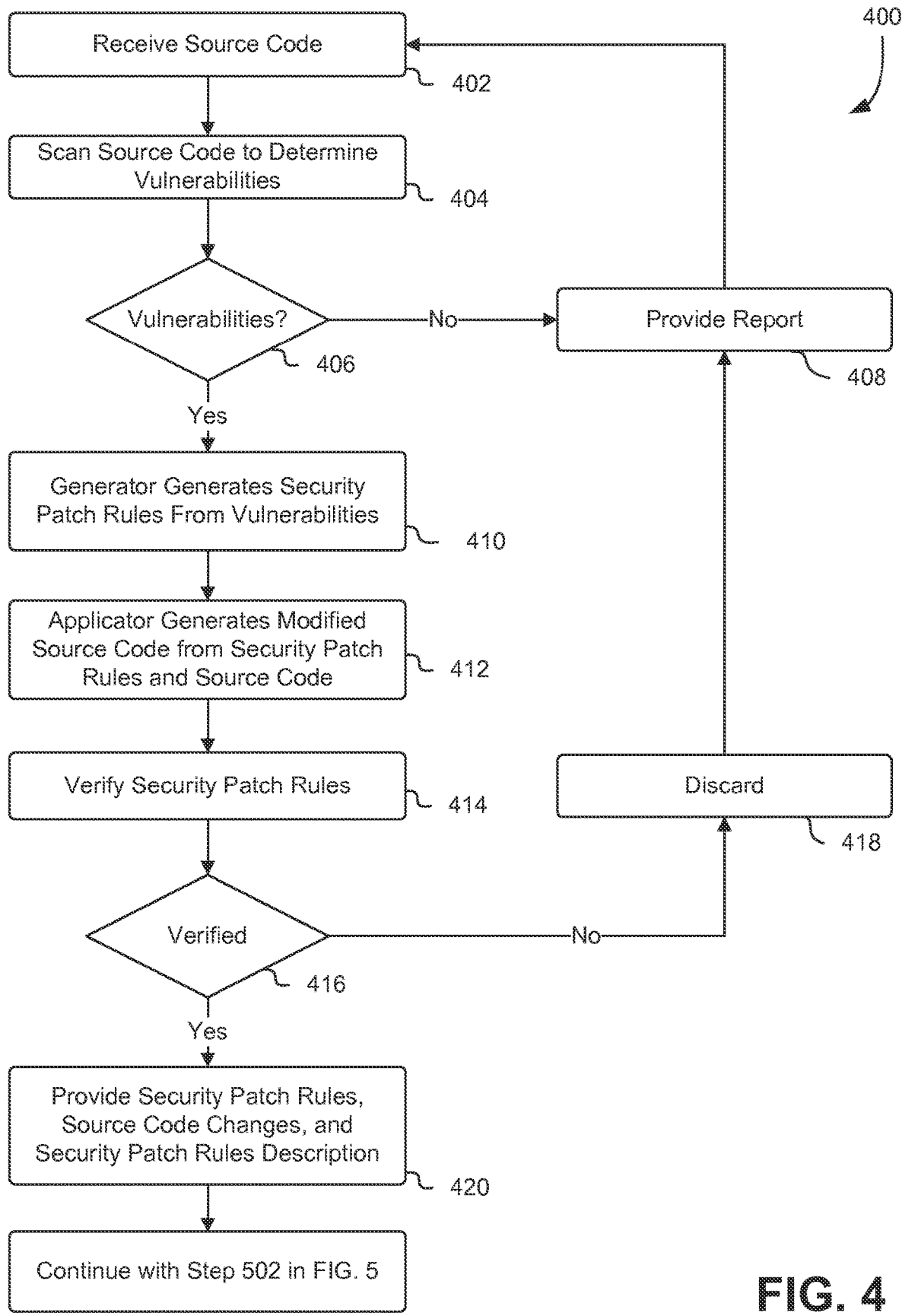
FIGS. 4 and 5 illustrate an example process for performing auto-remediation on computer system security vulnerabilities in source code in accordance with an embodiment.
Figure 5:
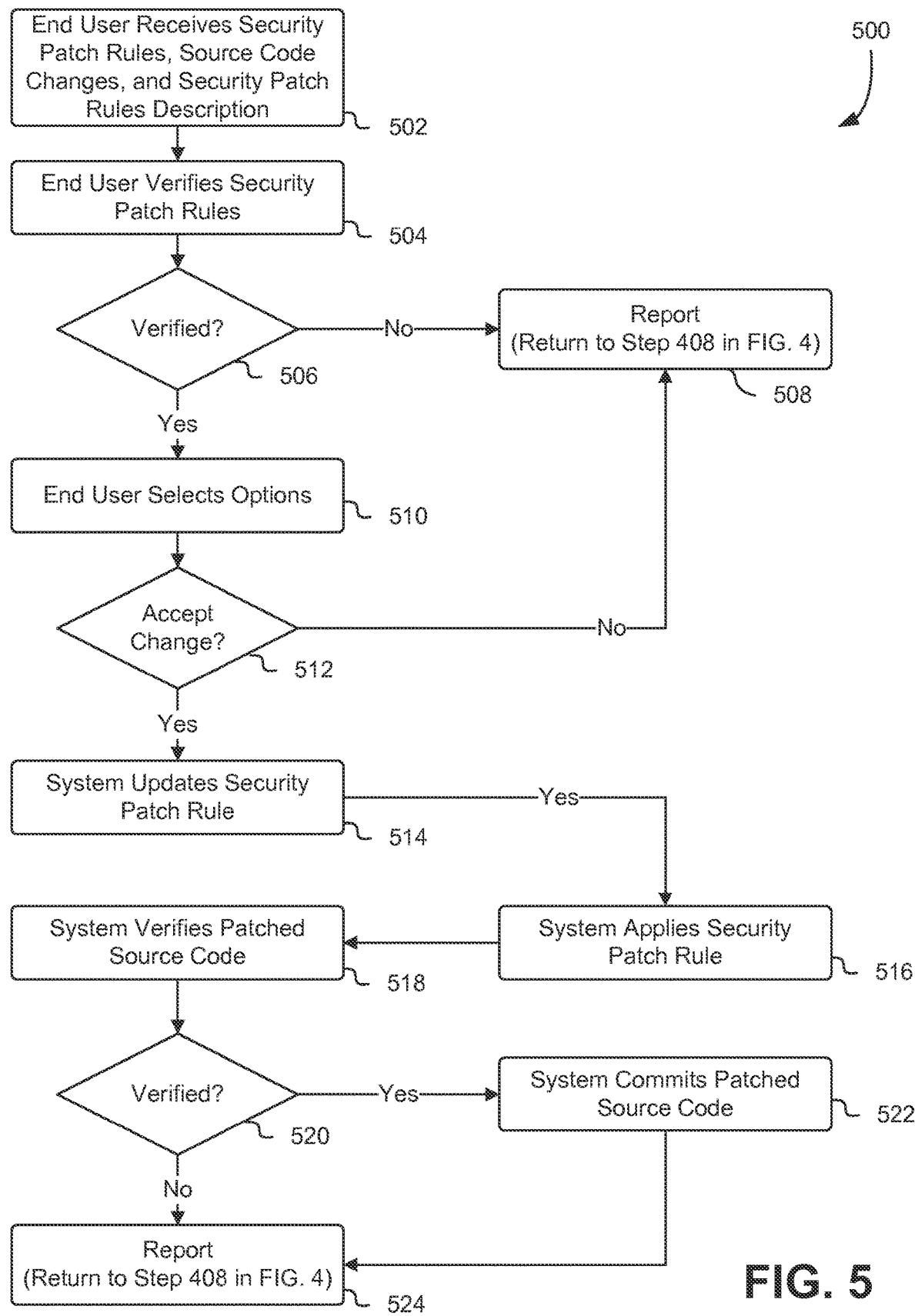

FIGS. 4 and 5 illustrate a process for performing auto-remediation on computer system security vulnerabilities in source code as described herein in connection with FIG. 1 and in accordance with an embodiment. FIG. 4 illustrates a first part 400 of the process for performing auto-remediation on computer system security vulnerabilities in source code where security patch rules in review phase are generated along with a description of the changes and additional value (or optional parameters) associated with the security patch rules. FIG. 5 illustrates a second part 500 of the process for performing auto-remediation on computer system security vulnerabilities in source code where the security patch rules are verified, a solution is chosen, and additional values are established. An auto-remediation engine such as the auto-remediation engine 208 described herein in connection with FIG. 2 and/or one or more processes associated therewith may perform the process illustrated in FIGS. 4 and 5. In the second part 500 of the example process illustrated in FIGS. 4 and 5, steps 502 through 512 may be performed by an end user and/or may be performed by a process such as, for example, an expert system as described herein.

Beginning in FIG. 4, the source code may be received 402 and scanned for vulnerabilities 404 as described above. The source code may be received from a source code repository, or may be provided by a customer in the form of a source code list, or may be scanned from a customer or client site. If no vulnerabilities 406 are detected, the auto-remediation engine may provide a report 408 to the owner of the source code. The report may be in the form of an email, a text message, a dynamically generated web page, an alarm, an alert, or some other such method of alerting the owner of the source code regarding the results of the vulnerability scan.

If one or more vulnerabilities 406 are detected, a security fix generator may generate and/or select one or more security patch rules 410 based at least in part on the detected vulnerabilities. The security patch rules 410 generated by the security fix generator may be in review mode (also referred to herein as in "review phase") as described below. A security patch applicator may then generate modified source code 412 by applying the one or more security patch rules in review mode to the source code representation to produce a set of candidate modified source code representations. The one or more security patch rules may then be verified 414 by a security patch rule verification process and/or by a security subject matter expert. Those security patch rules that are not verified 416 may be discarded 418 and a report 408 indicating the unverified security patch rules may be generated. Those security patch rules that are verified 416 may then be provided for further processing 420 along with source code changes, descriptions of the security patches, and/or other such information associated with the security patch rules as described herein in connection with FIG. 3.

Continuing with FIG. 5, an end user (or a process) may first receive 502 the security patch rules and the source code changes, descriptions of the security patches, and/or other such information associated with the security patch rules provided for further processing 420 (from FIG. 4). The end user (or a process) may first verify the security patch rules 504 and, if not verified a report 508 indicating the unverified security patch rules may be generated. In some embodiments, the end user may use a selection tool such as a web page interface to verify and/or not verify the security patch rules and, as a result of not verifying a security patch rule, the report may be provided to the auto-remediation engine. In some embodiments, a process (such as an expert system) may verify and/or not verify the security patch rules and, as a result of not verifying a security patch rule, a report may be provided to both the auto-remediation engine as well as to the owner of the source code.

If the security patch rules are verified 506, the end user (or a process) may select options 510 to, for example, provide missing additional parameters and then may determine whether to accept the changes 512 specified in the security patch rules. At this point, the security patch rules may be in an apply mode (also referred to herein as "apply phase") as described below. If it is determined not to accept the changes 512, a report 508 may be generated as described above. If it is determined to accept the changes 512, the auto-remediation engine may then complete any updates to the security patch rule 514 from the provided additional parameters, may apply the security patch rule 516 to the source code to produce the patched source code, and then may verify the patched source code 518. If the patched source code is verified 520, the auto-remediation engine may commit the patched source code 522. If the patched source code is not verified 520, a report 524 to that effect may be generated.

Figure 6:
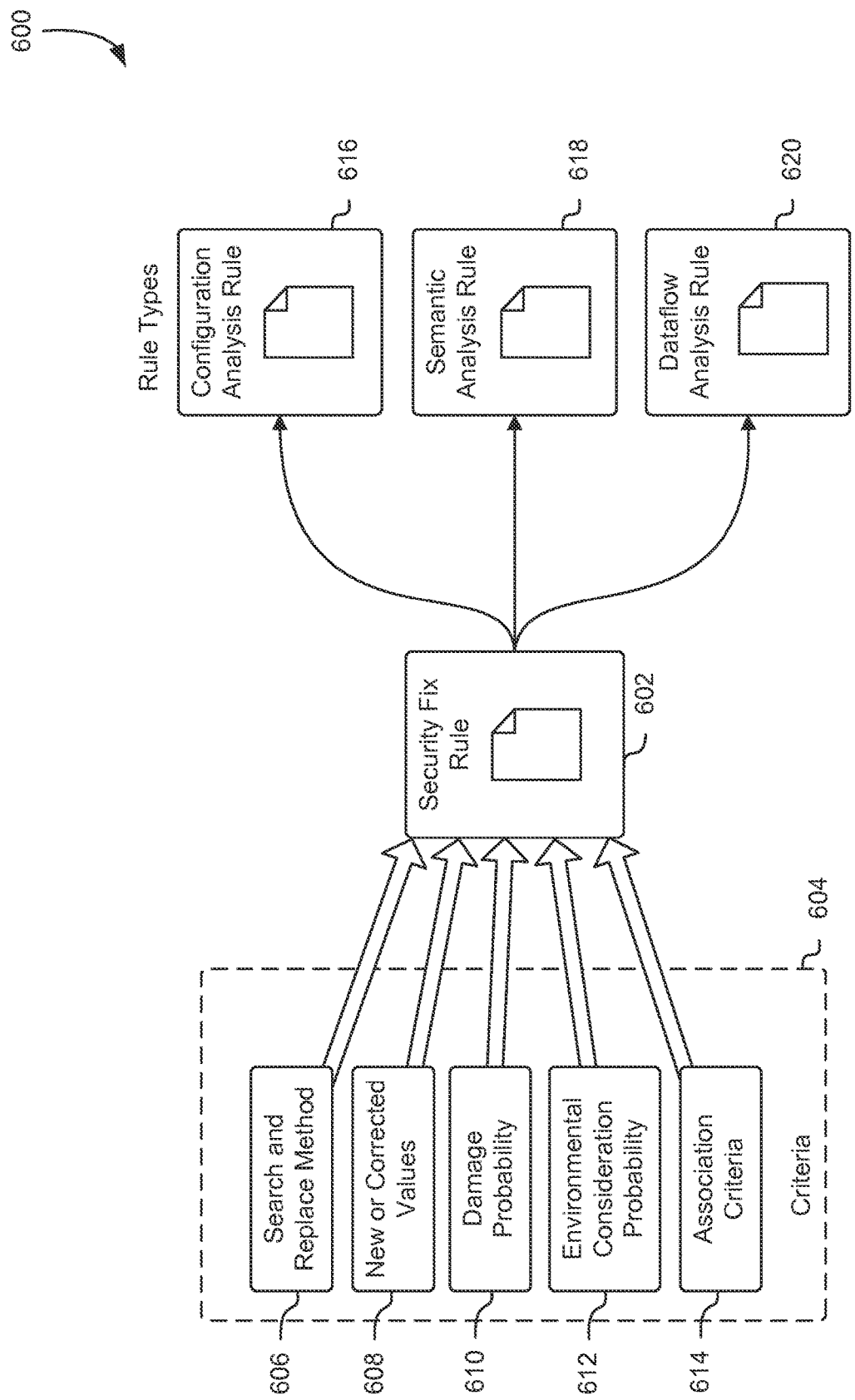
FIG. 6 illustrates an example diagram of the elements and types of a security fix rule in accordance with an embodiment.

FIG. 6 illustrates a diagram 600 of the elements and types of a security fix rule as described herein in connection with FIG. 1 and in accordance with an embodiment. A security fix rule 602, which expresses a security fix, may be based on one or more criteria 604. Because a security fix rule 602 is designed to associate a security fix to a type of security vulnerability, there may be unspecified values such as, for example, the location of the vulnerability in the security fix rule 602. The criteria 604 may be used to locate those unspecified values and to attempt to determine them and may also be used to determine the probability that applying the security fix rule 602 may cause secondary effects.

For example, the criteria 604 may include a means of expressing the search and replace method 606 for a source code representation. A search and replace method may be expressed as a combination of a search method and a replace method. A search may use exact match based on, for example, line and column numbers within the source code representation. A search may also use pattern matching using, for example, regular expressions. A search may also be based on position analysis data where, for example, an attacker has the most control (i.e., the vulnerability may be highest). A search may also be based on a domain specific language that may be used to perform a search within a hierarchical structure (e.g., an XML or JSON specification) and that also may be used to generate a lookup within such hierarchical structures based at least in part on the associated hierarchy. A replace may use an exact replacement (i.e., specified by the rule), a replace before, a replace after, an insert, or some other such replacement. In some embodiments, the new or corrected values 608 that may be used in the replacement may be specified as part of the search and replace method 606. In some embodiments, the new or corrected values 608 that may be used in the replacement may be specified separately from the search and replace method 606.

Criteria 604 may also include a damage probability 610 (i.e., an indication of the probability that the rule may cause other parts of the source code representation to fail), environmental consideration probability 612 (i.e., an indication of the probability that the rule may require changes to the operating environment associated with the source code representation), and/or association criteria 614 (i.e., criteria used to associate a particular vulnerability and/or class of vulnerabilities with the remediation provided by the security fix rule 602).

There may be a plurality of rule types of security fix rules which may be used to provide remediation to particular vulnerabilities and/or classes of vulnerabilities. A first rule type is a configuration analysis rule 616, which may be a rule for addressing vulnerabilities in a configuration file that may be associated with a software system. It is common practice to implement software systems (e.g., servers, operating systems, or services) with configuration files that allow customization by end-users based on the operating environment. Changing some configuration values may introduce known security vulnerabilities. A configuration analysis rule 616 may be authored to detect such vulnerabilities in configuration files and to remove them by adding configuration options, altering configuration options, or removing configuration options.

A second rule type is a semantic analysis rule 618, which may be a rule for addressing vulnerabilities in source code related to, for example, arguments to methods, default values, or common programming errors. It is common to implement a source code library with an application programming interface (API) that expresses common function calls with one or more default arguments. Such default arguments may be left unspecified by the API user, but in some environments, may also introduce vulnerabilities. This may be particularly true in environments with nested API calls (i.e., where the invocation of a first API call uses such default arguments to select other API calls). Similarly, an argument used in an API call that may not introduce security vulnerabilities in some environments may introduce security vulnerabilities in other environments. A semantic analysis rule 618 may be authored to detect such vulnerabilities to remove them by specifying arguments, altering arguments, or removing arguments.

A semantic analysis rule 618 may also be authored to detect common logic errors in source code representations and to remediate them, thus improving code quality. Programming languages such as Java, C, C++, and C # have overloaded the equals sign operator to allow both assignment (i.e., to assign a value to a variable) and binary comparison (i.e., to detect whether two values are equal). For example, the statement "foo=7" assigns the value seven to the variable "foo" while the statement "foo==7" checks if the value of the variable "foo" equals seven. A statement to do a binary comparison and perform some actions based on that comparison may be expressed as "if (foo==7) do_actions(foo)" but the statement "if (foo=7) do_actions(foo)" (with a single equals sign) is also a valid statement in such languages. Because this second statement, while legal, is probably incorrect, a semantic analysis rule 618 may be specified to remediate such a statement. However, because the source code may be reliant on such an error, such a security fix rule may have a high damage probability 610.

A dataflow analysis rule 620 may be altered to traverse a dataflow within a source code representation and determine the most appropriate point within that dataflow to, for example, apply encryption, process output, or preprocess calls to external systems or services. An example of where such a rule may be used is when a user is entering secure information such as a credit card on a web page. Before such secure information is transferred to the web service, it may be encrypted and may normally be encrypted using a secure connection. However, when the secure information is received at the web service, it may normally be decrypted for processing. Such processing may include storing the information for further use in, for example, a database. A dataflow analysis rule 620 may be authored to traverse the dataflow and detect where, in the dataflow, the information is stored, and to ensure that it is encrypted before storage. As may be contemplated, the types and examples of security fix rules described herein are illustrative examples and other such types and examples of security fix rules may be considered as within the scope of the present disclosure.

FIGS. 7A and 7B illustrate a specification for a configuration analysis security fix rule as described herein in connection with FIG. 6 and in accordance with an embodiment. FIG. 7A shows the first part 700 of the specification for the security fix rule illustrated in FIGS. 7A and 7B. FIG. 7B shows the second part 702 of the specification for the security fix rule illustrated in FIGS. 7A and 7B. The security fix rule illustrated in FIGS. 7A and 7B modifies a configuration file to ensure that directory listing functionality is disabled. Since the configuration value is optional in many implementations, the security fix rule provides for two cases that may remediate the source code vulnerability. In the first case (lines 023 to 031), if the optional configuration value is specified but not disabled (i.e., the flag is set to "0"), the remediation disables it by setting the flag from "0" to "1," thereby removing the vulnerability. In the second case (lines 032 to 045), whether the optional configuration value is specified or not, an explicit command to disable it on initiation is issued, thereby removing the vulnerability.

FIGS. 8A and 8B illustrate a specification for a semantic analysis security fix rule as described herein in connection with FIG. 6 and in accordance with an embodiment. FIG. 8A shows the first part 800 of the specification for the security fix rule illustrated in FIGS. 8A and 8B. FIG. 8B shows the second part 802 of the specification for the security fix rule illustrated in FIGS. 8A and 8B. The security fix rule illustrated in FIGS. 8A and 8B specifies one or more methods of identifying binary expressions within conditional expressions that make use of the equals sign and converting them to a double equals sign. In Java source code, for example, the statement "a=b" assigns the value of variable "b" to variable "a," while the statement "a==b" tests whether the value of variable "a" equals the value of variable "b." Within conditional statements such as "if-then" blocks, "while" loops, a single equals sign (assignment) is probably an error and should be replaced by a double equals sign. This change is accomplished in lines 042 to 055 in the security fix rule illustrated in FIGS. 8A and 8B.

FIGS. 9A, 9B, and 9C illustrate a specification for a dataflow analysis security fix rule as described herein in connection with FIG. 6 and in accordance with an embodiment. FIG. 9A shows the first part 900 of the specification for the security fix rule illustrated in FIGS. 9A, 9B, and 9C. FIG. 9B shows the second part 902 of the specification for the security fix rule illustrated in FIGS. 9A, 9B, and 9C. FIG. 9C shows the first part 904 of the specification for the security fix rule illustrated in FIGS. 9A, 9B, and 9C. The security fix rule illustrated in FIGS. 9A, 9B, and 9C specifies one or more methods of identifying the optimal point within a dataflow to wrap the reference to the credit card number with an encryption method. This security fix rule makes use of a security API (lines 037 to 044 and lines 065 to 072). Because key management facilities may be site dependent, this rule requires the developer to provide basic key management facilities (lines 045 to 048 and lines 073 to 076). This security fix rule is extremely intrusive and can have significant environmental considerations (line 001).

Figure 10:
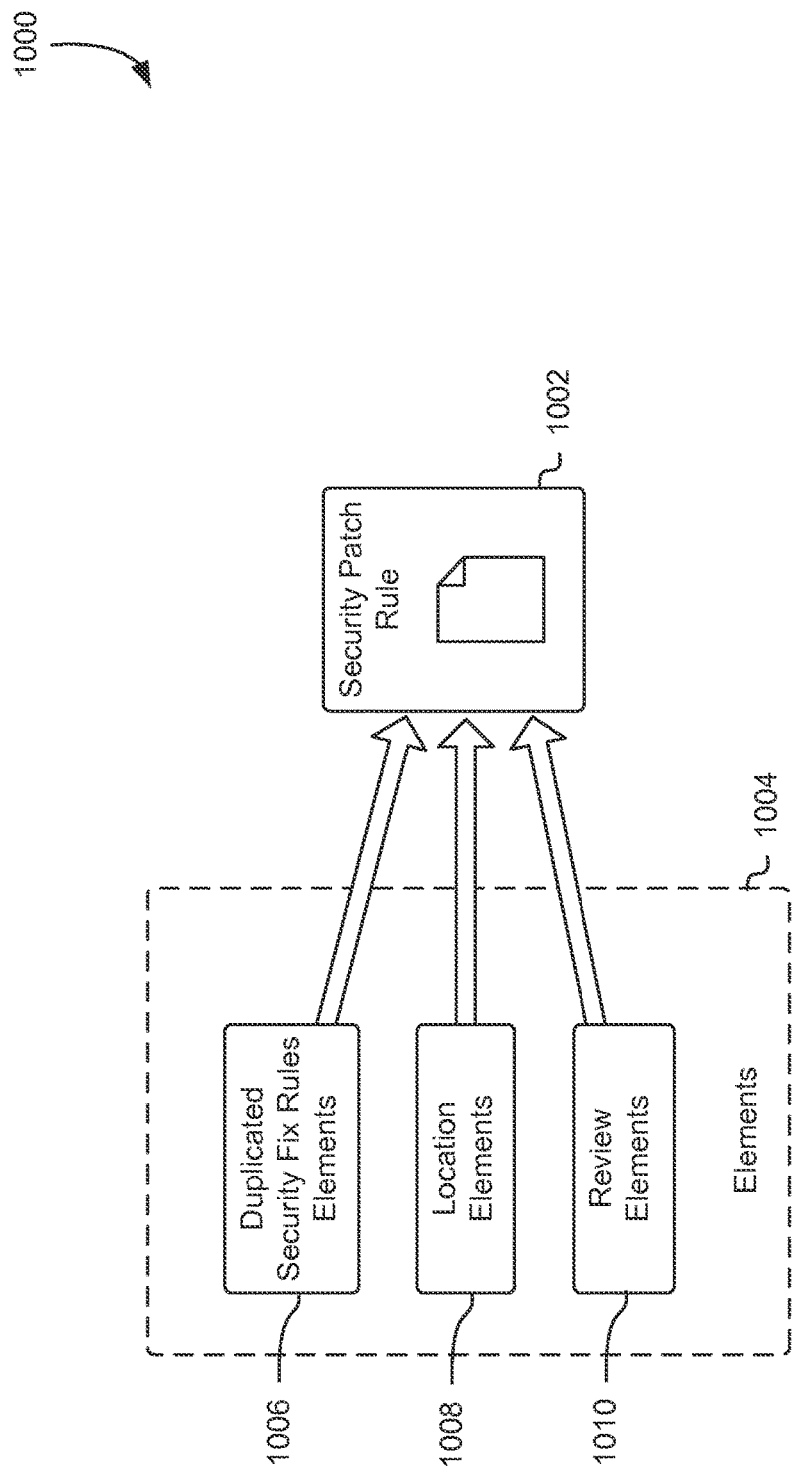
FIG. 10 illustrates an example diagram of the elements of a security patch rule in accordance with an embodiment.

FIG. 10 illustrates an example diagram 1000 of the elements of a security patch rule as described herein in connection with FIG. 1 and in accordance with an embodiment. A security patch rule 1002 may be based on a security fix rule as described herein in connection with FIG. 6. A security patch rule may express one or more security fixes for vulnerabilities identified by scanning a source code representation, and is designed to explicitly map a security fix rule to a specific security vulnerability by, for example, determining locations within the source code representation to apply the security patch. A security patch rule 1002 may include one or more elements 1004 such as elements duplicated from the associated security fix rule 1006, location elements 1008, and review elements 1010. The location elements 1008 may be determined based on position analysis data, line and column numbers, or other such data and/or metadata. The review elements 1010 may include additional parameters that may be filled in by a process or user as well as the status of the security patch rule (i.e., whether it is ready for review, whether it has been reviewed and is ready to be finalized with additional parameters, or whether it has been finalized and is ready to be applied).

Figure 11:
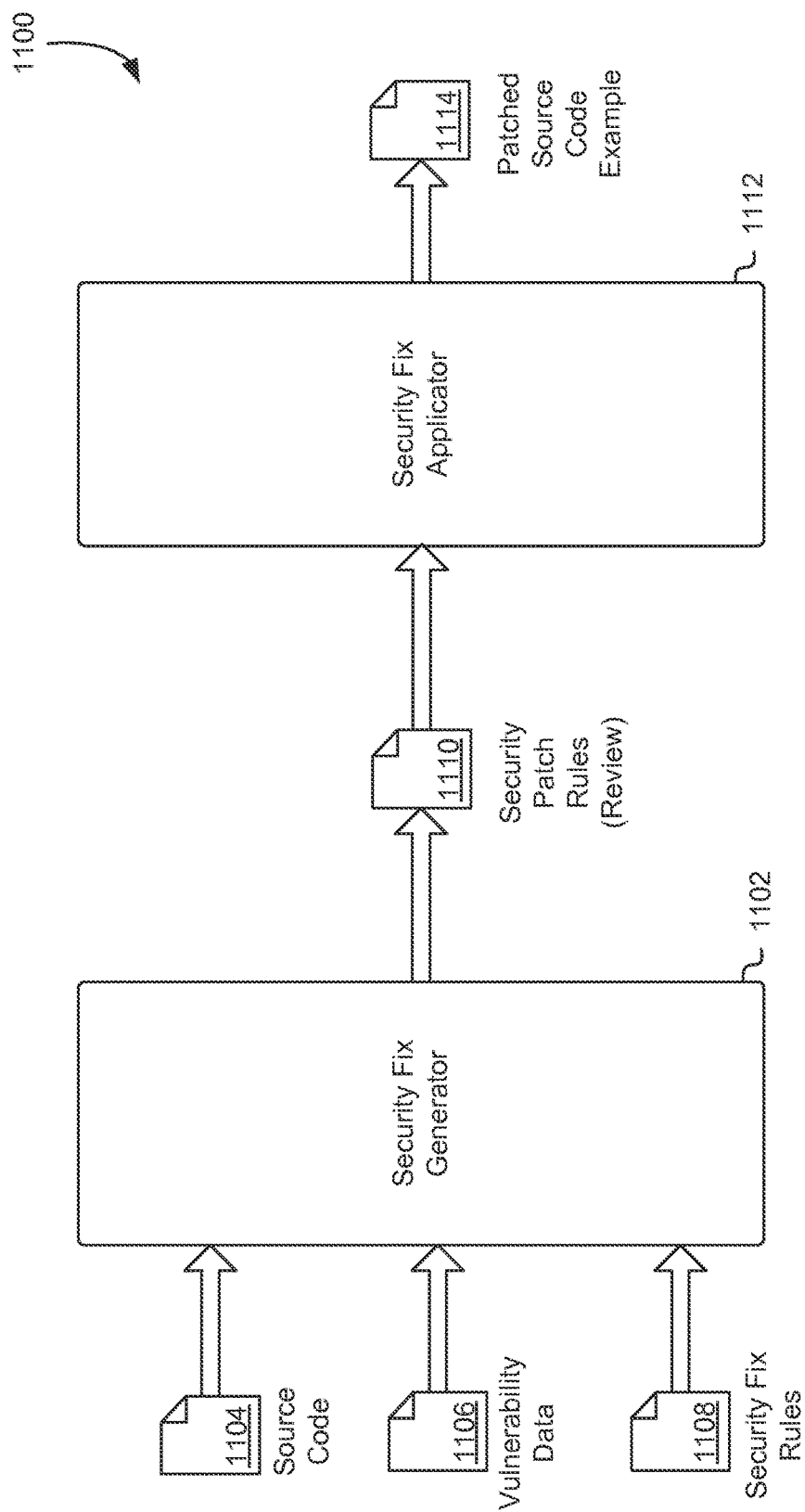
FIG. 11 illustrates an example environment where a security patch generator may be used to generate a security patch rule in accordance with an embodiment.

FIG. 11 illustrates an environment 1100 where a security patch generator may be used to generate a security patch rule as described herein in connection with FIG. 1 and in accordance with an embodiment. A security fix generator 1102 may receive a source code representation 1104, vulnerability data 1106, and one or more security fix rules 1108. The vulnerability data may include position analysis data and/or metadata as described above. The security fix generator may generate one or more security patch rules 1110 in review phase with, for example, positional data filled in based on the vulnerability data 1106. In some embodiments, a security fix applicator 1112 may be used to apply the security patch rules 1110 to the source code representation 1104 to produce one or more patched source code examples 1114. The one or more patched source code examples may be used in subsequent processing to evaluate the impact of applying the security patch rules 1110 to the source code representation 1104 and/or to verify the security patch rules 1110 as described herein.

FIGS. 12A, 12B, and 12C illustrate a specification for a security patch rule in review phase as described herein in connection with FIG. 6 and in accordance with an embodiment. FIG. 12A shows the first part 1200 of the specification for the security patch rule in review phase illustrated in FIGS. 12A, 12B, and 12C. FIG. 12B shows the second part 1202 of the specification for the security patch rule in review phase illustrated in FIGS. 12A, 12B, and 12C. FIG. 12C shows the third part 1204 of the specification for the security patch rule in review phase illustrated in FIGS. 12A, 12B, and 12C. The security patch rule in review phase illustrated in FIGS. 12A, 12B, and 12C is a dataflow analysis rule as described in connection with FIG. 6. A security patch rule in review phase is a security patch rule that is ready for review by, for example, a security subject matter expert, an end user, or a process. The security patch rule illustrated in FIGS. 12A, 12B, and 12C corresponds to the security fix rule illustrated in FIGS. 9A, 9B, and 9C and has had data such as location data filled in as described in connection with FIG. 10. The security patch rule illustrated in FIGS. 12A, 12B, and 12C has determined the location within a data flow trace to wrap the reference to the credit card number with an encryption method (see, for example, lines 035 to 047). As with the security fix rule illustrated in FIGS. 9A, 9B, and 9C, this security patch rule makes use of a security API. This security patch rule also requires the user to provide basic key management facilities (lines 051 to 052 and lines 079 to 082). As this rule is in the review phase, there are multiple solutions proposed (lines 033 and 061) and one or more properties are not yet defined (lines 051 to 052 and lines 079 to 082).

Figure 13:
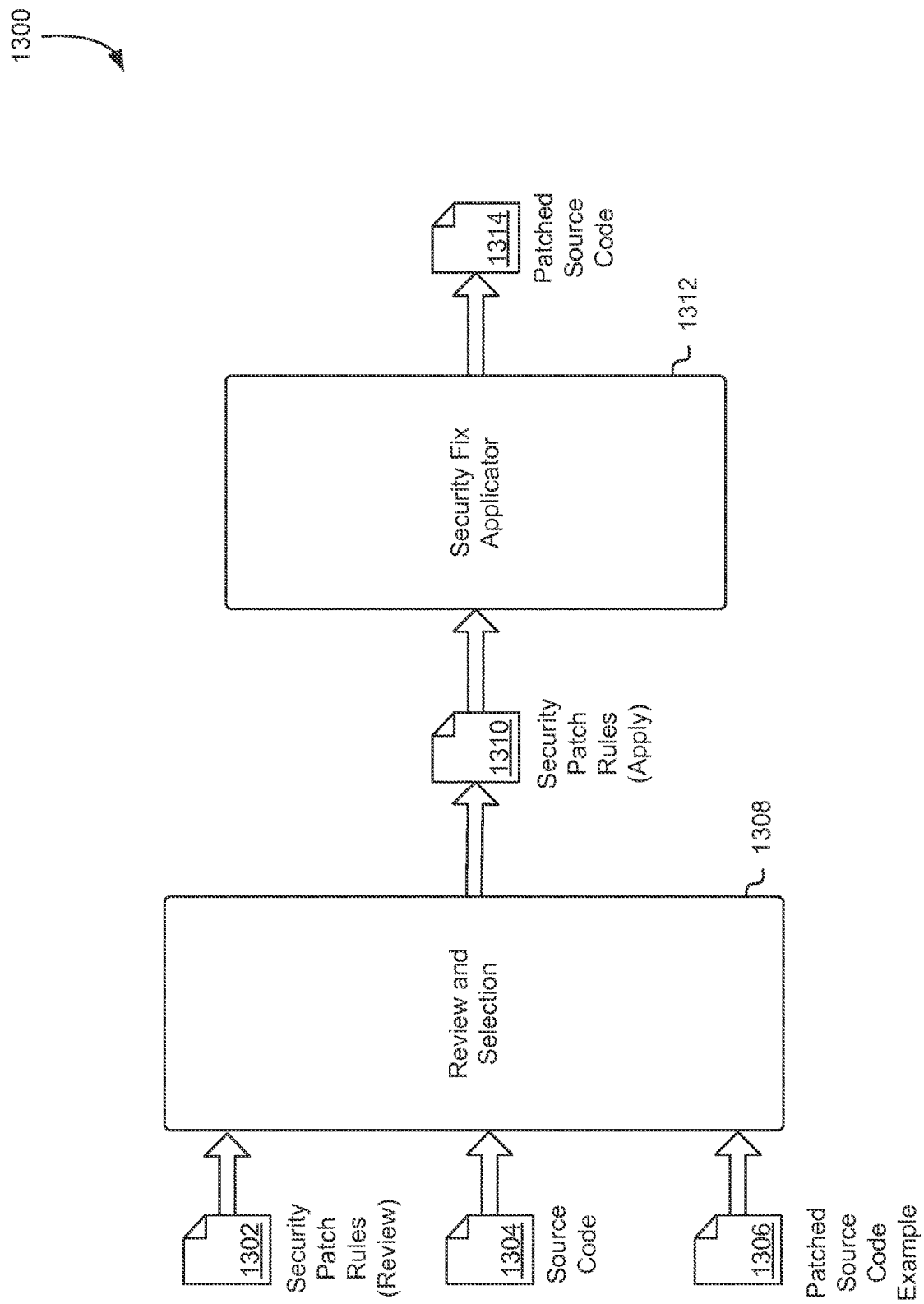
FIG. 13 illustrates an example environment where a security patch applicator may be used to apply and commit patched source code in accordance with an embodiment.

FIG. 13 illustrates an environment 1300 where a security patch applicator may be used to apply and commit patched source code in accordance with an environment. Security patch rules in review phase 1302 may be provided for review and selection 1308. As described above, the source code representation 1304 and/or one or more patched source code examples 1306 may also be provided as inputs for review and selection 1308. For example, the one or more patched source code examples 1306 may be used to aid in selecting a preferred remediation by illustrating the effects of applying the security patch rules to the source code representation.

In some embodiments, review and selection 1308 of security patch rules in review phase 1302 may be performed by a security subject matter expert, or an end-user, or a process, or may be performed by a combination of these and/or other such entities. In some embodiments, review and selection 1308 may be performed multiple times by multiple such entities. Review and selection 1308 may allow the selection of a preferred remediation from a plurality of possible remediations specified in the security patch rules in review phase 1302 and may also allow the specification of any additional parameters specified in the security patch rules in review phase 1302. As a result of the review and selection 1308, a security patch rule in apply phase 1310 may be produced that may then be applied to the source code representation 1304 by a security fix applicator 1312 to produce the patched source code 1314.

FIGS. 14A and 14B illustrate an example specification for a security patch rule in apply phase as described herein in connection with FIG. 1 and in accordance with an embodiment. FIG. 14A shows the first part 1400 of the specification for the security patch rule in apply phase illustrated in FIGS. 14A and 14B. FIG. 14B shows the second part 1402 of the specification for the security patch rule in apply phase illustrated in FIGS. 14A and 14B. A security patch rule in apply phase is a security patch rule that has been reviewed and is ready to be applied. The security patch rule illustrated in FIGS. 14A and 14B corresponds to the dataflow analysis security patch rule in review phase illustrated in FIGS. 12A, 12B, and 12C. The security patch rule illustrated in FIGS. 14A and 14B identifies the optimal point within a data flow trace to wrap the reference to the credit card number with an encryption method (lines 036 to 047) and, as with the security patch rule illustrated in FIGS. 12A, 12B, and 12C, this security patch rule makes use of a security API and requires the developer to provide basic key management facilities (lines 051 to 053). As this rule is in the apply phase, a single solution is proposed and the one or more properties have been defined.

Figure 15:
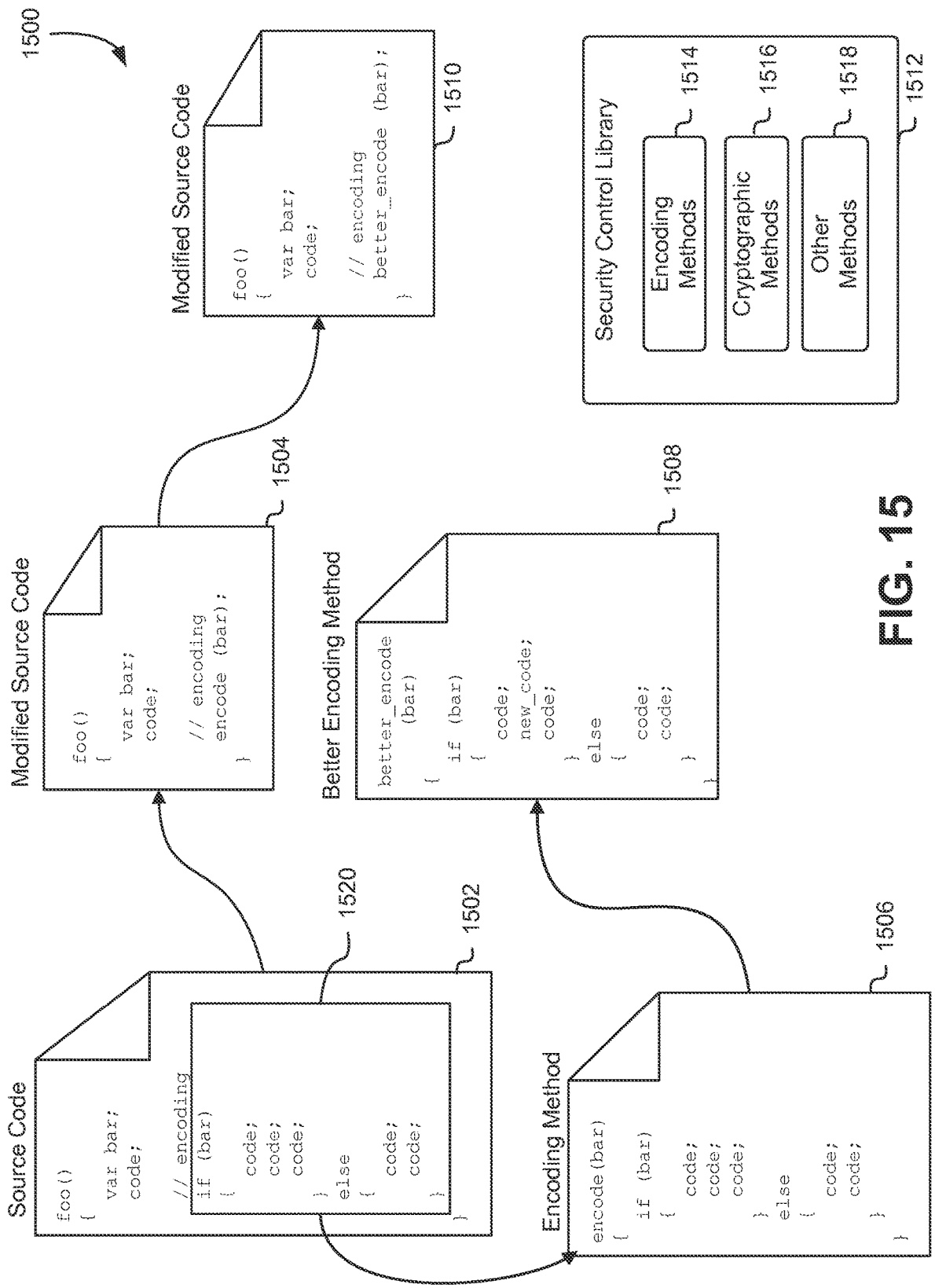
FIG. 15 illustrates an example environment where a security control library may be used to generate security patches in accordance with an embodiment.

FIG. 15 illustrates an environment 1500 where a security control library may be used to generate security patches in accordance with an environment. In the example illustrated in FIG. 15, a source code representation 1502 includes a section of code 1520 that implements an encoding method. One method of generating a security patch may include implementing the encoding method as a separate function 1506 and modifying the source code representation 1502 to produce a modified source code representation 1504 that calls the separate function 1506. Such a method may be beneficial if, for example, the encoding method may be frequently used in the source code representation 1502. In some embodiments, the encoding method as a separate function 1506 may also be included in a security control library 1512 that may include a plurality of encoding methods 1514, cryptographic methods 1516, and/or other methods 1518. In some embodiments, a vulnerability may be identified in an encoding method as a separate function 1506 and may then be addressed in the encoding method itself. In such embodiments, a better encoding method 1508 may be produced by patching the encoding method as a separate function 1506. A modified source code representation 1510 may then be produced by replacing the call to the encoding method as a separate function 1506 with a call to the better encoding method 1508.

Figure 16:
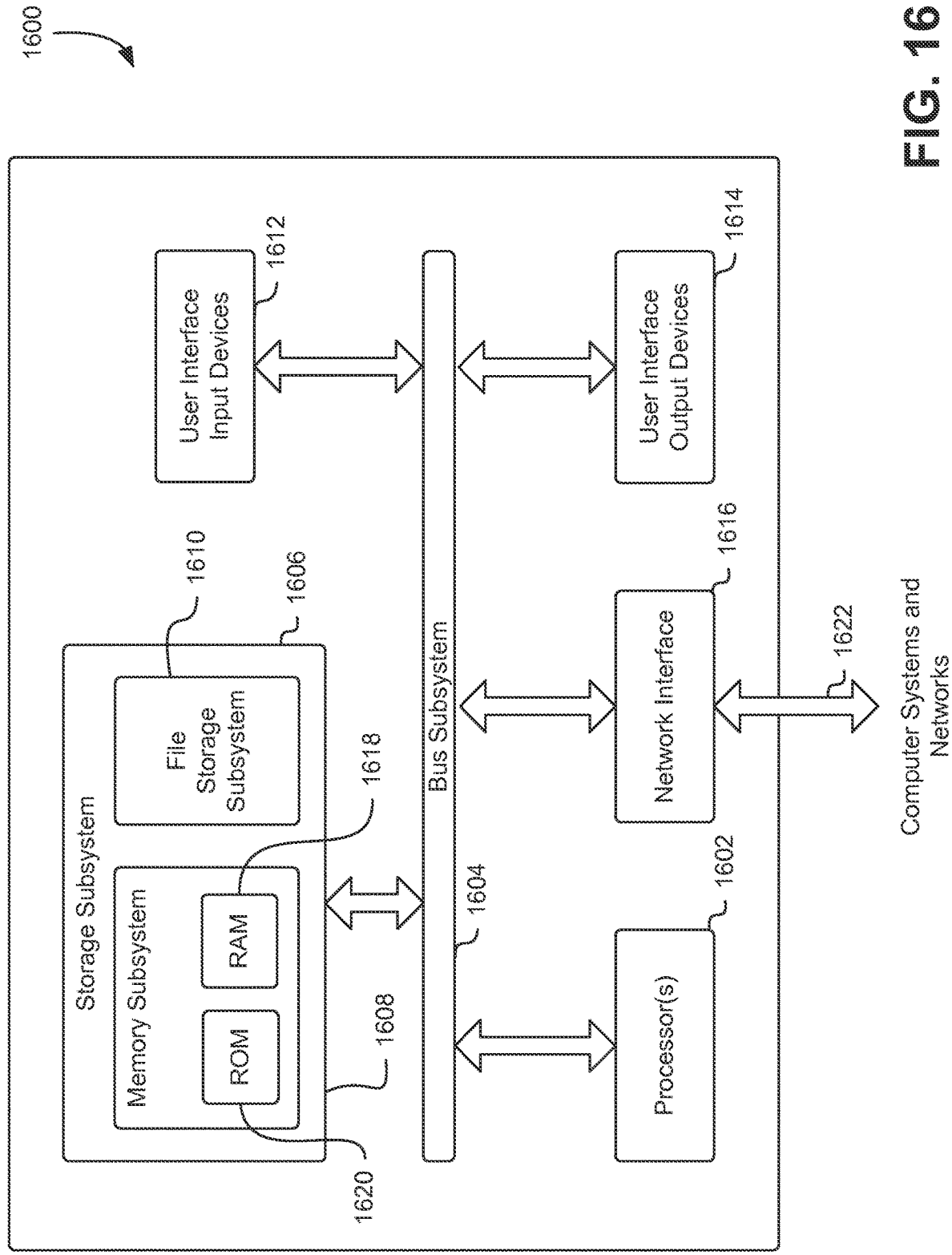
FIG. 16 illustrates an environment in which various embodiments can be implemented.

FIG. 16 is a simplified block diagram of a computer system 1600 that may be used to practice an embodiment of the present invention. In various embodiments, one or more instances of the computer system 1600 may be used to implement any of the systems illustrated and described above. For example, one or more instances of the computer system 1600 may be used to implement processes for performing auto-remediation on computer system security vulnerabilities in source code according to the present disclosure. As shown in FIG. 16, the computer system 1600 may include one or more processors 1602 that may be configured to communicate with and are operatively coupled to a number of peripheral subsystems via a bus subsystem 1604. These peripheral subsystems may include a storage subsystem 1606, comprising a memory subsystem 1608 and a file storage subsystem 1610, one or more user interface input devices 1612, user interface output devices 1614, and a network interface subsystem 1616.

The bus subsystem 1604 may provide a mechanism for enabling the various components and subsystems of computer system 1600 to communicate with each other as intended. Although the bus subsystem 1604 is shown schematically as a single bus, alternative embodiments of the bus subsystem may utilize multiple busses.

The network interface subsystem 1616 may provide an interface 1622 to other computer systems and networks. The network interface subsystem 1616 may serve as an interface for receiving data from and transmitting data to other systems from the computer system 1600. For example, the network interface subsystem 1616 may enable a user computer system device to connect to the computer system 1600 via the Internet and/or other network, such as a mobile network, and facilitate communications using the network(s) to, for example, submit source code representations for auto-remediation of source code vulnerabilities.

The user interface input devices 1612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. Further, in some embodiments, input devices may include devices usable to obtain information from other devices. Input devices may include, for instance, magnetic or other card readers, one or more USB interfaces, near field communications (NFC) devices/interfaces and other devices/interfaces usable to obtain data (e.g., security fix rules, security patch rules, or security control library methods) from other devices. In general, use of the term "input device" is intended to include all possible types of devices and mechanisms for inputting information to the computer system 1600.

The user interface output devices 1614 may include a display subsystem, a printer, non-visual displays (e.g., audio and/or tactile output devices), or other such display devices. Generally, the output devices 1614 may invoke one or more of any of the five senses of a user. For example, the display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 1600. The user interface output devices 1614 may be used, for example, to generate and/or present user interfaces to facilitate user interaction with applications performing processes described herein and variations therein, when such interaction may be appropriate. While a computer system 1600 with user interface output devices is used for the purpose of illustration, it should be noted that the computer system 1600 may operate without an output device, such as when the computer system 1600 is operated in a server rack and, during typical operation, an output device is not needed.

The storage subsystem 1606 may provide a computer-readable storage medium for storing the programming and data constructs that provide the functionality of the present invention. Software (programs, code modules, instructions) that, when executed by one or more processors 1602 may provide the functionality of the present invention, may be stored in storage subsystem 1606. The storage subsystem 1606 may also provide a repository for storing data used in accordance with the present invention. The storage subsystem 1606 may comprise memory subsystem 1608 and disk or file storage subsystem 1610. The storage subsystem may include database storage for security fix rules, file storage for security patch rules, and/or other storage functionality.

The memory subsystem 1608 may include a number of memory devices including, for example, random access memory (RAM) 1618 for storage of instructions and data during program execution and read-only memory (ROM) 1620 in which fixed instructions may be stored. The file storage subsystem 1610 may provide a non-transitory persistent (non-volatile) storage for program and data files, and may include a hard disk drive, a floppy disk drive along with associated removable media, a compact disk read-only memory (CD-ROM) drive, a digital versatile disk (DVD), an optical drive, removable media cartridges, and other like storage media.

The computer system 1600 may be of various types including a personal computer, a portable computer, a workstation, a network computer, a mainframe, a kiosk, a server, or any other data processing system. Due to the ever-changing nature of computers and networks, the description of computer system 1600 depicted in FIG. 16 is intended only as a specific example for purposes of illustrating the preferred embodiment of the computer system. Many other configurations having more or fewer components than the system depicted in FIG. 16 are possible.

The various embodiments further can be implemented in a wide variety of operating environments, which in some cases can include one or more user computers, computing devices or processing devices that can be used to operate any of a number of applications. User or client devices may include any of a number of general purpose personal computers, such as desktop, laptop or tablet computers running a standard operating system, as well as cellular, wireless and handheld devices running mobile software and capable of supporting a number of networking and messaging protocols. Such a system may also include a number of workstations running any of a variety of commercially-available operating systems and other known applications for purposes such as development and database management. These devices may also include other electronic devices, such as dummy terminals, thin-clients, gaming systems and other devices capable of communicating via a network. These devices may also include virtual devices such as virtual machines, hypervisors and other virtual devices capable of communicating via a network.

The various embodiments of the present disclosure may utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, or any combination thereof.

In embodiments utilizing a web server, the web server may run any of a variety of server or mid-tier applications, including Hypertext Transfer Protocol ("HTTP") servers, Hypertext Transfer Protocol Secure ("HTTPS") servers, Transport Layer Security ("TLS") servers, File Transfer Protocol ("FTP") servers, Common Gateway Interface ("CGI") servers, data servers, Java servers, Apache servers, Internet Information Services ("IIS") servers, proxy servers (e.g., F5®, Squid, etc.), business application servers, and/or other such servers. The server(s) may also be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python®, JavaScript®, or TCL, as well as combinations thereof. The server(s) may also include database servers, including without limitation those commercially available from Oracle®, Microsoft®, Sybase®, and IBM® as well as open-source servers such as MySQL, Postgres, SQLite, NoSQL, Hadoop, MongoDB, or other servers capable of storing, retrieving, and accessing structured or unstructured data. Database servers may include table-based servers, document-based servers, unstructured servers, relational servers, non-relational servers, or combinations of these and/or other database servers.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such storage devices may also include a computer-readable storage media reader, a communications device (e.g., a modem, a network card (wireless or wired), or an infrared communication device), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (referred to herein as a "non-transitory computer-readable storage medium"), may be tangible (referred to herein as a "tangible computer-readable storage medium"), or may be both tangible and non-transitory (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving results of a scan of a representation of a source code, wherein the scan of the representation of the source code did not execute the representation of the source code;
   determining, from the results of the scan and without executing the representation of the source code, one or more vulnerabilities, wherein each vulnerability record of the one or more vulnerabilities at least specifies a respective location of a corresponding vulnerability of the one or more vulnerabilities within the representation of the source code;
   generating one or more security patch rules based at least in part on the one or more vulnerabilities and based at least in part on one or more security fix rules;
   verifying the one or more security patch rules;
   in response to the one or more security patch rules being verified, producing a security patch based at least in part on the one or more verified security patch rules; and
   applying the security patch to the representation of the source code.

2. The computer-implemented method of claim 1, wherein the representation of the source code is a data structure representation of the source code.

3. The computer-implemented method of claim 1, wherein the scanning is performed using static analysis.

4. The computer-implemented method of claim 1, wherein the one or more security fix rules are configuration analysis rules, wherein the configuration analysis rules generate the one or more security patch rules based on the one or more vulnerabilities being located in one or more configuration files in the representation of the source code.

5. The computer-implemented method of claim 1, wherein the one or more security fix rules are semantic analysis rules, wherein the semantic analysis rules generate the one or more security fix rules based on the one or more vulnerabilities being located in arguments to methods, default values, common programming errors or application programming interfaces in the representation of the source code.

6. The computer-implemented method of claim 1, wherein the one or more security fix rules are dataflow analysis rules, wherein the dataflow analysis rules generate the one or more security fix rules based on the one or more vulnerabilities being located in a dataflow of the representation of the source code to determine a particular point within the dataflow to apply encryption, process output or preprocess calls to external systems or services.

7. The computer-implemented method of claim 1, wherein the verifying is performed via an automated process to determine that the one or more security patch rules remediate the one or more vulnerabilities.

8. The computer-implemented method of claim 1, wherein the scanning further comprising:
   applying one or more security vulnerability rules to the representation of the source code to identify the one or more vulnerabilities by comparing the representation of the source code to one or more security vulnerability criteria, the one or more security vulnerability criteria specified in the one or more security vulnerability rules, wherein the one or more security vulnerability rules are based on historical vulnerabilities.

9. The computer-implemented method of claim 1, wherein applying the security patch to the representation of the source code to produce a patched representation of the source code comprises:
   identifying at least a portion of the representation of the source code based at least in part on the security patch;
   applying the security patch to the portion of the representation of the source code to produce a patched portion of the representation of the source code; and
   providing the patched portion of the representation of the source code.

10. A system comprising:
    a processor; and
    a memory storing instructions, which when executed causes the processor to:
    receive results of a scan of a representation of a source code, wherein the scan of the representation of the source code did not execute the representation of the source code;
    determine, from the results of the scan and without executing the representation of the source code, one or more vulnerabilities, wherein each vulnerability record of the one or more vulnerabilities at least specifies a respective location of a corresponding vulnerability of the one or more vulnerabilities within the representation of the source code;
    generate one or more security patch rules based at least in part on the one or more vulnerabilities and based at least in part on one or more security fix rules;
    verify the one or more security patch rules;
    in response to the one or more security patch rules being verified, produce a security patch based at least in part on the one or more verified security patch rules; and
    apply the security patch to the representation of the source code.

11. The system of claim 10, wherein the representation of the source code is a data structure representation of the source code.

12. The system of claim 10, wherein the scanning is performed using static analysis.

13. The system of claim 10, wherein the one or more security fix rules are configuration analysis rules, wherein the configuration analysis rules generate the one or more security patch rules based on the one or more vulnerabilities being located in one or more configuration files in the representation of the source code.

14. The system of claim 10, wherein the one or more security fix rules are semantic analysis rules, wherein the semantic analysis rules generate the one or more security fix rules based on the one or more vulnerabilities being located in arguments to methods, default values, common programming errors or application programming interfaces in the representation of the source code.

15. The system of claim 10, wherein the one or more security fix rules are dataflow analysis rules, wherein the dataflow analysis rules generate the one or more security fix rules based on the one or more vulnerabilities being located in a dataflow of the representation of the source code to determine a particular point within the dataflow to apply encryption, process output or preprocess calls to external systems or services.

16. The system of claim 10, wherein the verifying is performed via an automated process to determine that the one or more security patch rules remediate the one or more vulnerabilities.

17. The system of claim 10, comprising further instructions which when executed by the processor causes the processor to:
apply one or more security vulnerability rules to the representation of the source code to identify the one or more vulnerabilities by comparing the representation of the source code to one or more security vulnerability criteria, the one or more security vulnerability criteria specified in the one or more security vulnerability rules, wherein the one or more security vulnerability rules are based on historical vulnerabilities.

18. The system of claim 10, comprising further instructions which when executed by the processor causes the processor to:
identify at least a portion of the representation of the source code based at least in part on the security patch;
apply the security patch to the portion of the representation of the source code to produce a patched portion of the representation of the source code; and
provide the patched portion of the representation of the source code.

19. A non-transitory computer readable medium storing instructions which when executed causes a processor to:
receive results of a scan of a representation of a source code, wherein the scan of the representation of the source code did not execute the representation of the source code;
determine, from the results of the scan and without executing the representation of the source code, one or more vulnerabilities, wherein each vulnerability record of the one or more vulnerabilities at least specifies a respective location of a corresponding vulnerability of the one or more vulnerabilities within the representation of the source code;
generate one or more security patch rules based at least in part on the one or more vulnerabilities and based at least in part on one or more security fix rules;
verify the one or more security patch rules;
in response to the one or more security patch rules being verified, produce a security patch based at least in part on the one or more verified security patch rules; and
apply the security patch to the representation of the source code.

20. The non-transitory computer readable medium of claim 19, wherein the representation of the source code is a data structure representation of the source code.

21. The non-transitory computer readable medium of claim 19, wherein the scanning is performed using static analysis.

22. The non-transitory computer readable medium of claim 19, wherein the one or more security fix rules are configuration analysis rules, wherein the configuration analysis rules generate the one or more security patch rules based on the one or more vulnerabilities being located in one or more configuration files in the representation of the source code.

23. The non-transitory computer readable medium of claim 19, wherein the one or more security fix rules are semantic analysis rules, wherein the semantic analysis rules generate the one or more security fix rules based on the one or more vulnerabilities being located in arguments to methods, default values, common programming errors or application programming interfaces in the representation of the source code.

24. The non-transitory computer readable medium of claim 19, wherein the one or more security fix rules are dataflow analysis rules, wherein the dataflow analysis rules generate the one or more security fix rules based on the one or more vulnerabilities being located in a dataflow of the representation of the source code to determine a particular point within the dataflow to apply encryption, process output or preprocess calls to external systems or services.

25. The non-transitory computer readable medium of claim 19, wherein the verifying is performed via an automated process to determine that the one or more security patch rules remediate the one or more vulnerabilities.

26. The non-transitory computer readable medium of claim 19, comprising further instructions which when executed by the processor causes the processor to:
apply one or more security vulnerability rules to the representation of the source code to identify the one or more vulnerabilities by comparing the representation of the source code to one or more security vulnerability criteria, the one or more security vulnerability criteria specified in the one or more security vulnerability rules, wherein the one or more security vulnerability rules are based on historical vulnerabilities.

27. The non-transitory computer readable medium of claim 19, comprising further instructions which when executed by the processor causes the processor to:
identify at least a portion of the representation of the source code based at least in part on the security patch;
apply the security patch to the portion of the representation of the source code to produce a patched portion of the representation of the source code; and
provide the patched portion of the representation of the source code.

* * * * *